United States Patent [19]

Suzuki

[11] Patent Number: 5,808,981
[45] Date of Patent: Sep. 15, 1998

[54] INFORMATION RECORDING/REPRODUCING APPARATUS CAPABLE OF MOVEMENT IN TWO DIRECTIONS OF A CARD-LIKE INFORMATION RECORDING MEDIUM

[75] Inventor: Kazunori Suzuki, Yokohama, Japan

[73] Assignee: Canon Kabushiki Kaisha, Tokyo, Japan

[21] Appl. No.: 726,427

[22] Filed: Oct. 4, 1996

Related U.S. Application Data

[63] Continuation of Ser. No. 217,100, Mar. 24, 1994, abandoned.

[30] Foreign Application Priority Data

Mar. 25, 1993 [JP] Japan ..................... 5-066750

[51] Int. Cl.$^6$ .................................. G11B 7/085
[52] U.S. Cl. ..................... 369/44.28; 235/456
[58] Field of Search ................ 369/32, 44.28; 235/454, 456

[56] References Cited

U.S. PATENT DOCUMENTS

| | | | |
|---|---|---|---|
| 4,935,916 | 6/1990 | Suzuki et al. | 369/215 |
| 5,121,374 | 6/1992 | Barton et al. | 369/32 X |
| 5,163,034 | 11/1992 | Kitai et al. | 369/44.28 X |

FOREIGN PATENT DOCUMENTS

| | | |
|---|---|---|
| 904746 | 9/1986 | Belgium . |
| 0116936 | 8/1984 | European Pat. Off. . |
| 0230275 | 7/1987 | European Pat. Off. . |
| 0245511 | 11/1987 | European Pat. Off. . |
| 0296590 | 12/1988 | European Pat. Off. . |
| 0381113 | 8/1990 | European Pat. Off. . |
| 59-223887 | 12/1984 | Japan . |
| 1021688 | 1/1989 | Japan . |
| 2093884 | 4/1990 | Japan . |
| 2215629 | 8/1990 | Japan . |
| 3008124 | 1/1991 | Japan . |
| 2161632 | 1/1986 | United Kingdom . |

Primary Examiner—W. R. Young
Attorney, Agent, or Firm—Fitzpatrick, Cella, Harper & Scinto

[57] ABSTRACT

An information recording/reproducing apparatus records and/or reproduces information with a card-like information recording medium in which a plurality of guide tracks are formed. The apparatus includes an optical head for recording or reproducing information along the guide tracks, a head moving device for moving the optical head to and from along the guide tracks, and a recording medium moving device for moving the recording medium in a direction perpendicular to the guide tracks. The recording medium moving device is an ultrasonic motor.

5 Claims, 21 Drawing Sheets

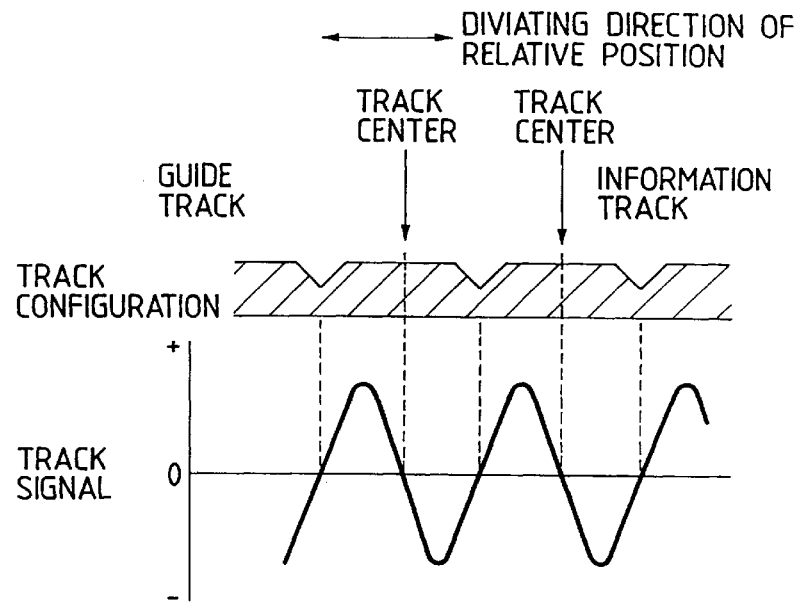
FIG. 10A PRIOR ART — TRACK CONFIGURATION
FIG. 10B PRIOR ART — TRACK SIGNAL
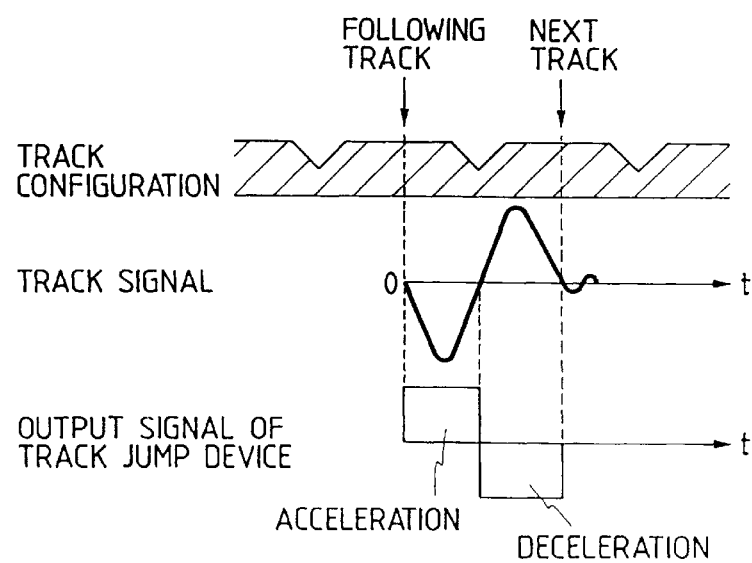
FIG. 11A PRIOR ART — TRACK CONFIGURATION
FIG. 11B PRIOR ART — TRACK SIGNAL
FIG. 11C PRIOR ART — OUTPUT SIGNAL OF TRACK JUMP DEVICE

SHUTTLE MOVING DIRECTION
= TRACK TRANSVERSE DIRECTION

OPTICAL CARD CONTACT PORTION

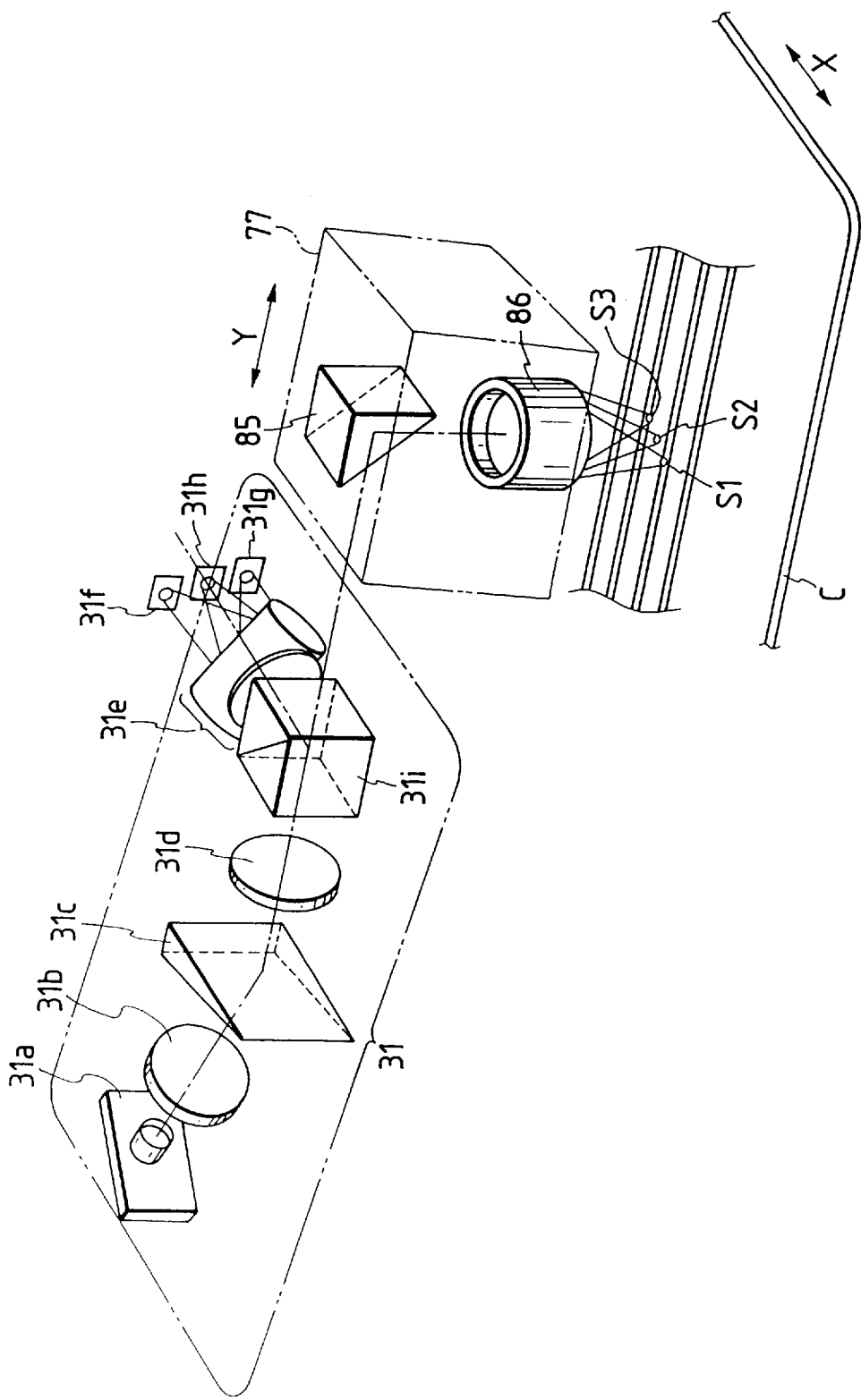

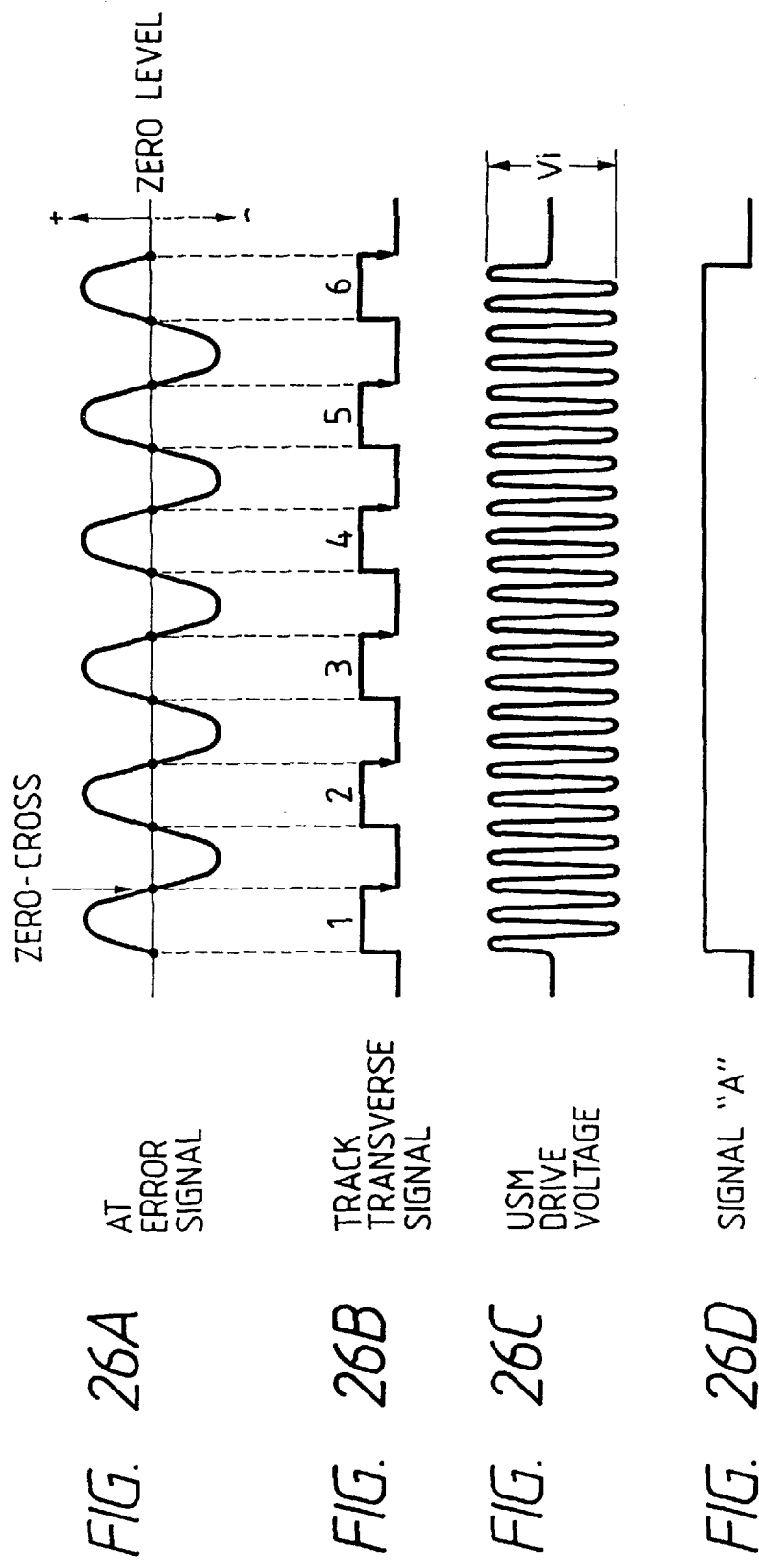

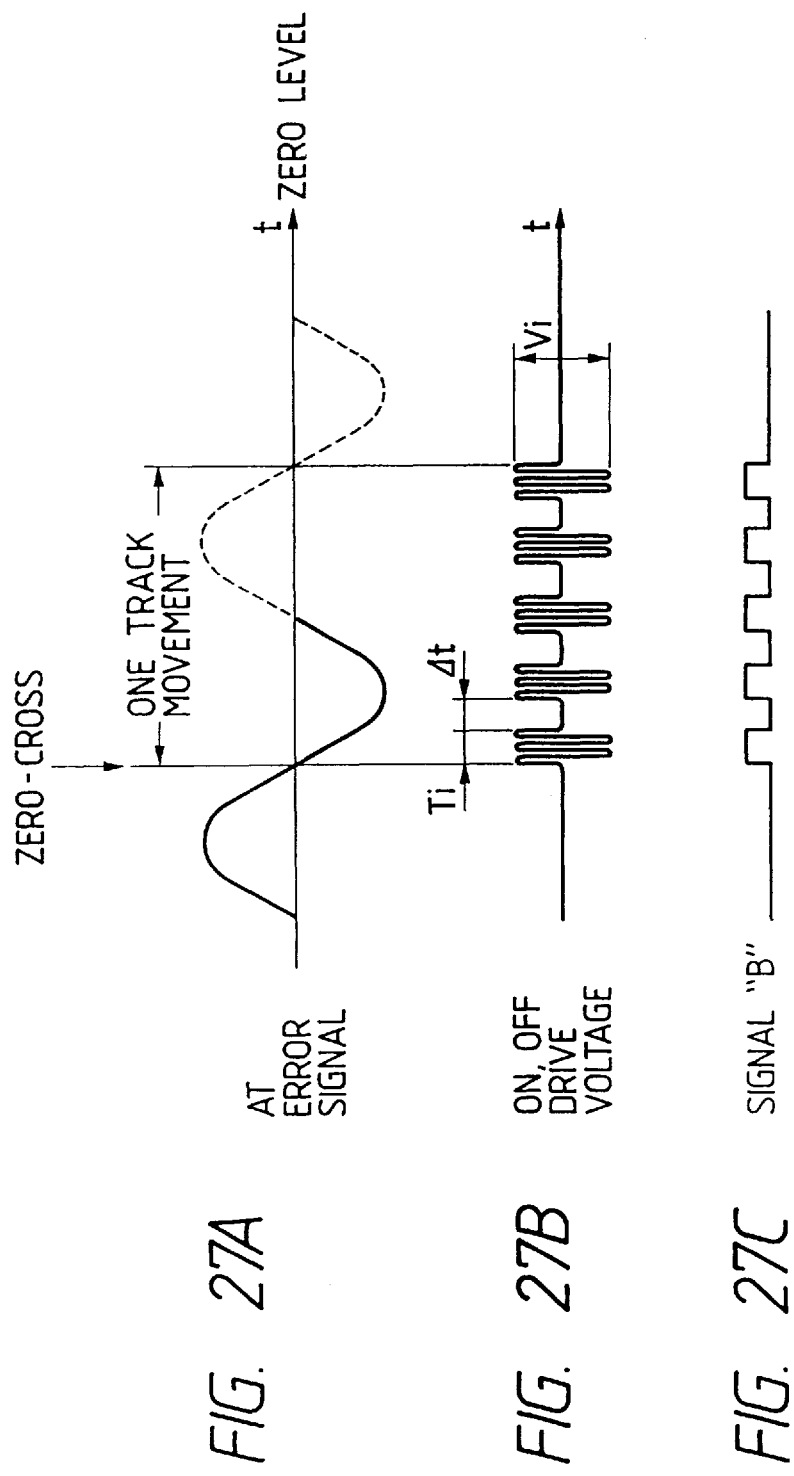

INFORMATION RECORDING/ REPRODUCING APPARATUS CAPABLE OF MOVEMENT IN TWO DIRECTIONS OF A CARD-LIKE INFORMATION RECORDING MEDIUM

This application is a continuation of application Ser. No. 08/217,100, filed Mar. 24, 1994, now abandoned.

BACKGROUND OF THE INVENTION

1. Field of the Invention

The present invention relate to an information recording/ reproducing apparatus for recording information in a card-like information recording medium and/or for reproducing information recorded in the recording medium.

2. Related Background Art

Information recording/reproducing apparatus employ either the magnetic method or the optical method. Among the two methods, the optical method is recently drawing attention. As information recording/reproducing apparatus using an optical beam, there are conventional apparatus employing CD of a disc recording medium being rotated, an optical disc for video disc, a magnetooptical disc, an optical card of a card recording medium being shuttled to and fro, and an optical tape.

These apparatus are used depending upon the purpose, among which the optical card is now a focus of attention because of the convenience of portability.

To use the optical card as an information recording medium, various suggestions have been made for such a method that an optical beam from a movable optical head is guided to illuminate an optical card, the optical card is linearly moved along an information track, and the optical head is moved in a direction perpendicular to the direction of the card linear motion, i.e., in a direction to cross information tracks on the optical card.

FIG. 1 and FIG. 2 show a conventional example of this method as is well known.

In the drawings, C represents an optical card having a recording section Ca on the back face thereof, 303 an optical card holding member (hereinafter referred to as a shuttle) for holding the optical card C moving to and fro in the directions of a double-headed arrow A, and 319 an optical head movable through an unrepresented drive mechanism in the directions of a double-headed arrow B perpendicular to the directions of the arrow A.

The shuttle 303 has a stepped portion 310 into which the optical card C is inserted. A press plate spring 313 is provided on one side in the directions of the arrow B and urges the optical card C against an edge 310 formed on the other side of the stepped portion 310. Also, the leading end of the optical card C inserted into the stepped portion 310 comes into contact with a stopper protrusion 314 to stop the optical card C at a predetermined position. Further, in order to control upward movement of the optical card C held in the stepped portion 310, optical card holding portions 311, 312 are formed on both sides of the recording section Ca with a clearance to avoid contact with the back face of the optical card C.

Numerals 304, 309 designate guide shafts fixed on the main body of apparatus in parallel with the intended moving directions A of shuttle 303 and at a predetermined distance to each other in the directions B. Bearings 305, 306 fixed on the shuttle 303 are slidably fit on the guide shaft 304, while a pair of upper and lower rollers 307 arranged on the shuttle 303 are rotatably engaged with the other guide shaft 309, whereby the shuttle 303 may be guided in the intended moving directions A.

An endless belt 315 is set on the back face of shuttle 303. The belt 315 is supported by a rotatable pulley 316, and a pulley 318 connected to a servo motor 317 so that rotation of the servo motor 317 can move the belt back and forth in the intended moving directions A.

Also, a voice coil motor method using a magnetic circuit is suggested as the shuttle driving means for the shuttle 303, as shown in FIG. 3. An inner yoke 401 is set through a voice coil 402, which is fixed to the shuttle 303. By this arrangement, the shuttle 303 is moved back and forth in the intended moving directions parallel to the information track direction. Here, 403 is an outer yoke and 404 a permanent magnet.

Also, FIGS. 4A, 4B and 4C show a shuttle for loading, positioning and holding the optical card therein. The optical card is held by the shuttle 502, to which a lot of parts are attached, such as card holders 501a, 501b and springs 505a, 505b for holding the longitudinal side edges of the optical card, shafts 504a, 504b for rotatably supporting them, arms 507a, 507b engaged with the associated shafts, a slider 510 for pivoting the arms 507a, 507b through rollers 506a, 506b provided thereon, and a motor for driving the slider 510.

These shuttles 303, 502 are arranged to have a lock pin 320 for positioning the shuttle in carrying or discharging the optical card C, as shown in FIG. 1.

The shuttle is kept stationary by a lock mechanism composed of a lock solenoid 321 supported on the apparatus main body and a lock lever 322 engageable with the lock pin 320.

In the conventional examples employing the above arrangements, the shuttle with the optical card loaded thereon is moved back and forth relative to the optical head in the information track direction of the optical card, i.e., in the longitudinal direction of card, and the optical head is moved in the direction perpendicular to the information tracks, whereby an information beam is recorded on a recording surface or reproduced therefrom.

Another method is shown in FIGS. 5, 6A to 6C, 7 and 8A to 8C.

FIG. 5 is a perspective view to show such an arrangement that a mounting table or shuttle 602 supported as movable along rails 601a, 601b in the X direction is arranged to keep the optical card C stationary while pressing it by plate springs 603a, 603b in a card pressing member 603 from the top of the card near the side edges. Feed rollers 604a, 604b are provided for inserting the optical card C into the shuttle 602 and are rotated by a motor 606 through a driving shaft 605 to carry the optical card C. Notches 603c, 603d are provided in the shuttle 602 and the press plate 603 for optical card C in order to insert the optical card C up to an optical card contact portion 602a in the shuttle 602. The notches 603c, 603d are arranged such that the feed rollers 604a, 604b can go thereinto.

The motor 606 and the drive shaft 605 are arranged as movable up and down by actuating an iron core 608, which is fixed to an end of a member 607 movable about a shaft 607a, by a spring 609 and a solenoid 610.

FIGS. 6A, 6B and 6C are cross sectional views along A—A line in FIG. 5. FIG. 6A shows a state in which the optical card C is being inserted into the shuttle 602, FIG. 6B a state in which the feed rollers 604a, 604b are stepped away from the shuttle 602, and FIG. 6C a state in which the optical card C is being discharged from the shuttle 602. The operation is described for the conventional example of the above arrangement. The feed rollers 604a, 604b move the optical card C up to the contact portion 602a in the shuttle 602. When the optical card C comes into contact with the shuttle 602, the motor 606 stops. Then, the solenoid 610 raises the feed rollers 604a, 604b to complete the insertion of the optical card C into the shuttle 602. Subsequently, the optical card C on the shuttle 602 is linearly moved to and fro relative to an unrepresented optical head to effect recording or reproduction of information with irradiating the optical card C by the optical beam.

After the end of recording or reproduction, the optical card C goes into a discharge state. As shown in FIG. 6C, the solenoid 610 descends to take the rollers 604a, 604b into contact with the optical card C and then the motor 606 is actuated to rotate in the discharge direction.

FIG. 7 shows still another conventional example. There are feed roller shafts 711a, 711b arranged vertically in parallel with each other and rollers 713a, 713b, 713c, 713d positioned with a clearance to pinch the optical card C therebetween. A shuttle 712 has a contact portion 712a which is a positioning portion for the optical card C. Further, the insertion slot for shuttle 712 is made shorter than the longitudinal length of optical card C in relation with the arrangement of rollers, so that the feed rollers 713a to 713d can be well set. FIGS. 8A, 8B and 8C are cross sectional views along A—A line in FIG. 7, which show the same states as in FIGS. 6A, 6B and 6C, respectively.

Since the operation is similar to that of the example shown in FIGS. 6A to 6C, it is omitted to explain herein.

FIG. 9 is a scheme to show a popular control system for a conventional optical card information recording/reproducing apparatus, FIGS. 10A and 10B drawings to show a waveform of track signal detected with a relative positional deviation between an optical beam and a track, FIGS. 11A, 11B and 11C drawings to show a waveform of track signal with movement of optical beam by one track and a waveform of output signal from a track jump device for driving a tracking actuator, and FIGS. 12A and 12B drawings to show a waveform of oscillation of optical beam with a step signal.

In FIG. 9, 801 designates an optical card in which a plurality of parallel guide tracks are formed and in which recording regions for recording or reproducing information are linearly provided in parallel with the guide tracks. Numeral 802 denotes a linear motor, which moves to and fro in the direction perpendicular to the information tracks in the optical card 801. Numeral 803 is an optical unit, which is mainly composed of a semiconductor laser 804 as a light source, an optical component 805 such as a coupling lens, and a segmental photodetector 806 for detecting information, a focus signal and a track signal from the optical card.

Numeral 807 denotes a focusing actuator, which moves an objective lens 808 for focusing an optical beam from the optical unit 803 on the information track recording surface of optical card 801, in the directions perpendicular to the recording surface. Numeral 809 represents a tracking actuator, which moves the optical card in the directions perpendicular to the track direction. Numeral 810 is a movable member, which carries the optical unit, the focusing actuator 807, and the tracking actuator 809 in the track transverse directions. Numeral 820 is a track following control device, 821 a track jump device, and 822 a switch. The track jump device 821 generates an acceleration signal and deceleration signal in a step form as shown in FIG. 11C.

The operation is next described. First, suppose the track following control device 820 makes an optical beam follow up a certain track in an initial state. The track following control device 820 performs the so-called tracking servo control by which a relative positional deviation between an optical beam and the track center is kept equal to zero as shown in FIGS. 10A and 10B. The track following control device 820 performs such a feedback control that it outputs a signal for driving the tracking actuator 809 through the switch 822 in accordance with the polarity and the level of track signal received from the photodetector 806 so as to drive the tracking actuator 809 to move the optical beam to the track center.

Next, when the optical beam is moved to a track next to the currently following track, the switch 822 is changed over to release the track following control, and, as shown in FIG. 11C, the track jump device 821 outputs a step acceleration signal with a polarity according to the moving direction of the optical beam to the tracking actuator 809. Then, the track jump device 821 determines from the polarity change of the track signal that the optical beam moves a half of track pitch, and provides a step deceleration signal with a polarity opposite to that of the acceleration signal to the tracking actuator 809 to make the moving speed of optical beam nearly zero at the center of the next track. After that, it determines from a next change of polarity of track signal that the optical beam passes through the track center, and the switch 822 is returned to start the track following control. The shuttle 823 moves on a guide rail 824.

The optical card recording/reproducing apparatus constructed as described above, however, had the following problems.

The conventional examples as shown in FIG. 1 to FIGS. 4A to 4C are so arranged that after the optical card is inserted into the shuttle and positioned therein, the shuttle is moved to and fro relative to the optical head to carry out recording or reproduction on an information track or the optical head is moved to a position in an aimed track in the transverse directions to information tracks, i.e., in the directions perpendicular to the information tracks.

Since this arrangement moves the shuttle back and forth along the longitudinal direction of the optical card, the shuttle moving distance must be set to double or more of the track length of the optical card, which results in a drawback of requiring a large depth dimension of apparatus.

A recent subject of great significance is to increase the speed of recording and reproduction. In the conventional examples, the DC servo motor is employed for the mechanism for positioning and holding the optical card in the shuttle or for the shuttle drive through the pulley by the belt, which is the transmission member for linearly moving the shuttle to and fro. In another example a rack is set on the shuttle so that it can be driven by a DC servo motor through a gear. In another case the shuttle is driven by a voice coil of magnetic circuit fixed on the shuttle. In either case, weight reduction of shuttle or a high-power drive source is necessary for achieving the speed increase as described above.

There is, however, a limit of weight reduction because the shuttle must have various functions as described. Consequently, there was a problem that the shuttle could not be driven at a desired speed unless the drive power was increased. This resulted in increasing the weights and the sizes of the DC servo motor, the yokes and the permanent magnet in the magnetic circuit, which in turn made it difficult to achieve a compact and lightweight apparatus at a low cost.

Also, the conventional example shown in FIG. 1 is so arranged that the optical card is inserted into the shuttle in the same direction as the moving direction of shuttle. Then, if an error should release the lock of shuttle, the shuttle moves together with the optical card upon insertion thereof, which could fail to set the optical card at a regular position. As a result, the optical card could be deviated from the recording or reproducing position of the optical card where the optical head should work. Therefore, a sure lock mechanism is necessary for fixing the shuttle.

In case the shuttle is fixed by the solenoid for a long time, a lock error frequently occurs due to a temperature rise of the coil or dust going into the solenoid shaft, which greatly affected the reliability of apparatus.

Further, the conventional examples as shown in FIGS. 5 and 6A to 6C and in FIGS. 7 and 8A to 8C have no judging function of whether the optical card is certainly positioned in positioning the optical card in the shuttle while inserting the optical card into the shuttle. Thus, if dust or oil is deposited on the feed rollers, an inserting force causes the rollers to slip on the pinching portions of the optical card in insertion into the shuttle, resulting in imperfect insertion of card into the shuttle.

Even in this state, the apparatus in the conventional examples assume that the optical card is mounted in the shuttle, and proceed to perform the next operation. Then, information is recorded or reproduced with the optical card in the imperfect state as deviated from the shuttle. This caused a problem that the optical beam from the optical head impinged on a region outside the recording/reproducing area in the optical card, which made information recording or reproduction impossible.

In addition, a recent market need is to decrease the size, the weight and the cost of apparatus. The conventional examples, however, require a lot of mechanisms, for example the supporting portion of feed rollers, the motor and the speed reduction mechanism, or the releasing mechanism for feed rollers. To achieve a compact, lightweight and low-cost apparatus as described, such mechanisms tend to be packed in a small space. This made the mechanisms complicated, which increased the costs for machining and assembling. This was a hindrance to the cost reduction of apparatus.

Further, the conventional example as shown in FIG. 9 is so arranged that the optical head is moved in the directions perpendicular to the information tracks in the optical card mounted on the shuttle and the shuttle is moved along the information track direction, whereby information is recorded or reproduced with the optical card linearly moving to and fro.

This arrangement had the following drawback. When the optical beam is moved from a currently following track to an arbitrary track, i.e., in the track jump scanning, a condenser lens portion receives superposition of vibration due to the changeover between acceleration and deceleration of actuator itself for driving the condenser lens in a track jump operation and disturbance vibration due to the shuttle go-and-return motion. When the disturbance vibration works on the way of acceleration in the same direction, the acceleration is promoted. If the disturbance vibration acts in the opposite direction, the deceleration is effected. Thus, the position of optical beam is fluctuated on an aimed track to be in an unstable state. Even if a zero-cross signal were obtained momentarily, a tracking error signal was detected immediately thereafter, causing an access error.

SUMMARY OF THE INVENTION

It is an object of the present invention to provide an information recording/reproducing apparatus solving the above problems.

The above object can be achieved by an information recording/reproducing apparatus for recording and/or reproducing information with a card information recording medium in which a plurality of guide tracks are formed, comprising:

a recording/reproducing head for recording information along said guide tracks and/or for reproducing recorded information along said guide tracks;

recording/reproducing head moving means for moving said recording/reproducing head to and fro along said guide tracks; and recording medium moving means for moving said recording medium in a direction perpendicular to said guide tracks.

Also, the object can be achieved by an information recording/reproducing apparatus for recording and/or reproducing information with a card information recording medium in which a plurality of guide tracks are formed, comprising:

a recording/reproducing head for recording information along said guide tracks and/or for reproducing recorded information along said guide tracks;

recording/reproducing head moving means for moving said recording/reproducing head to and fro along said guide tracks;

recording medium moving means for moving said recording medium in a direction perpendicular to said guide tracks; and control means for controlling said recording medium moving means to move said recording/reproducing head to a desired guide track.

In one aspect of the invention, a vibration actuator is employed as a drive source for moving a card information recording medium, and the information recording medium is moved by vibration of the vibration actuator in the directions substantially perpendicular to the information track direction.

BRIEF DESCRIPTION OF THE DRAWINGS

FIGS. 10A and 10B are drawings to show a relation between tracks in an optical card and a track signal;

FIGS. 11A, 11B and 11C are drawings to show a relation between a track signal and an output signal for track jump;

FIGS. 18A and 18B are drawings to show a shuttle in FIG. 13, in which FIG. 18A is a back elevation and FIG. 18B is a cross section along D—D line in FIG. 18A;

FIG. 22 is a block diagram to show an optical system in FIG. 21;

FIG. 26A is a drawing to show an AT error signal obtained through a photodetector in crossing a track;

FIG. 26B is a drawing to show a track transverse signal obtained by binarizing the signal in FIG. 26A;

FIG. 26C is a drawing to show an USM drive voltage;

FIG. 26D is a drawing to show a signal given in seek operation;

FIG. 27A is a drawing to show an AT error signal for one track movement;

FIG. 27B is a drawing to show an ON and OFF drive voltage for stepped drive of USM; and FIG. 27C is a drawing to show a stepped signal given in track jump.

DETAILED DESCRIPTION OF THE PREFERRED EMBODIMENTS

The first embodiment of the present invention will be described with reference to FIG. 13 to FIGS. 19A to 19C.

Figure 1:
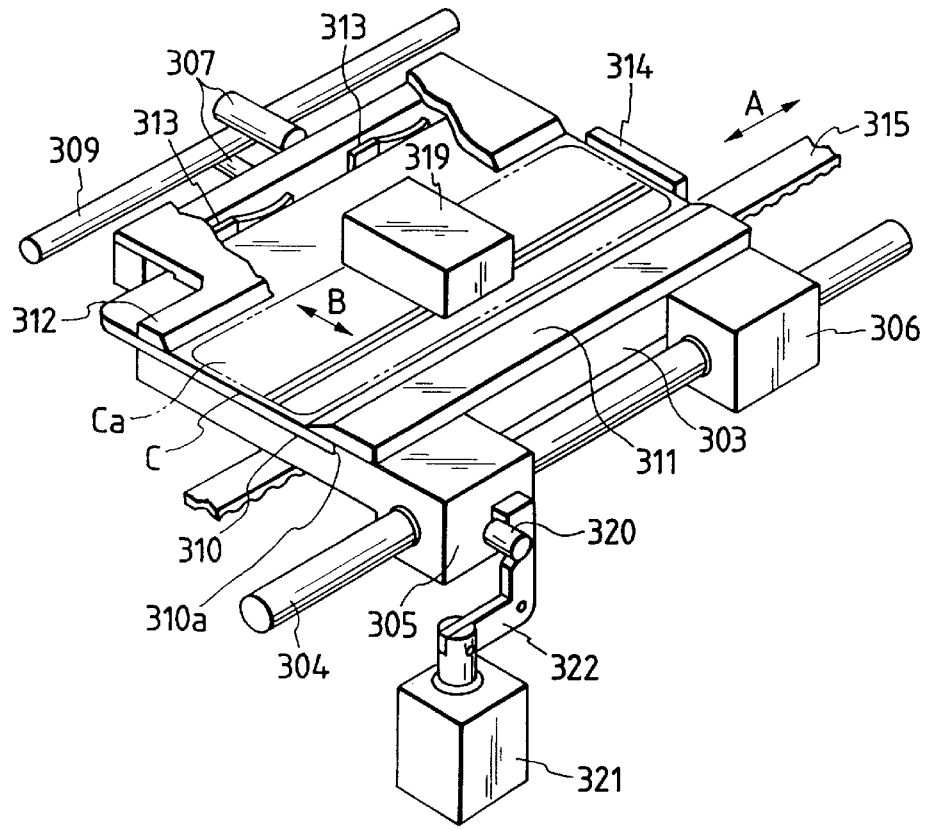
FIG. 1 is a diagrammatic perspective view of a conventional optical card recording/reproducing apparatus.
Figure 2:
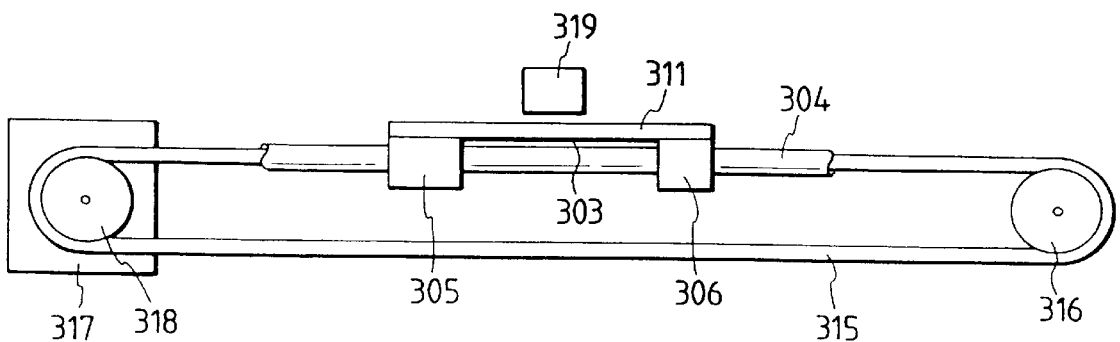
FIG. 2 is a cross section of FIG. 1.
Figure 3:
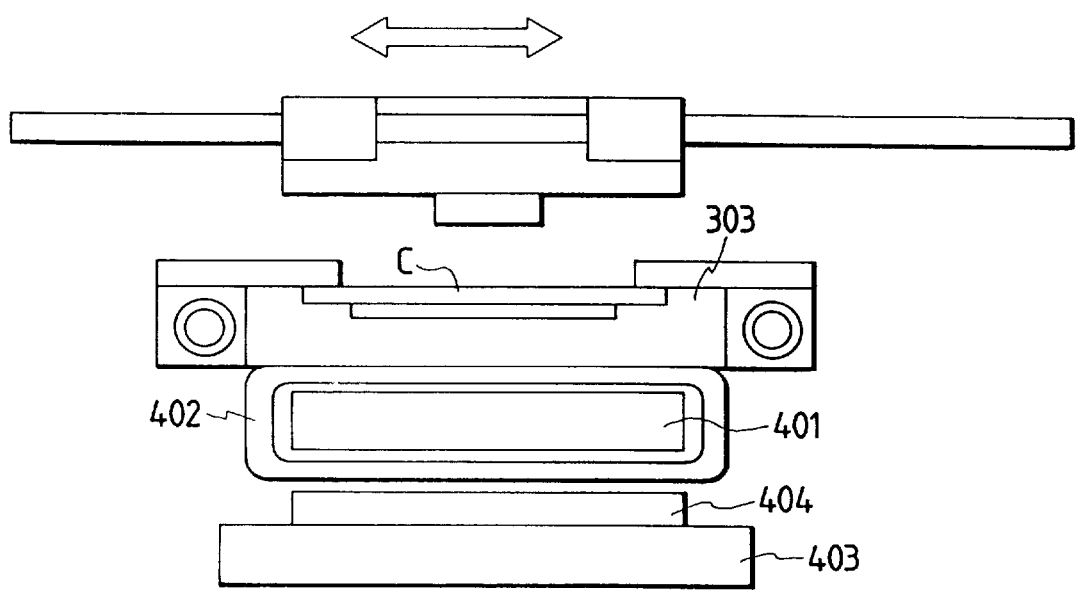
FIG. 3 is a cross section of an optical head in FIG. 1.
Figure 4A:
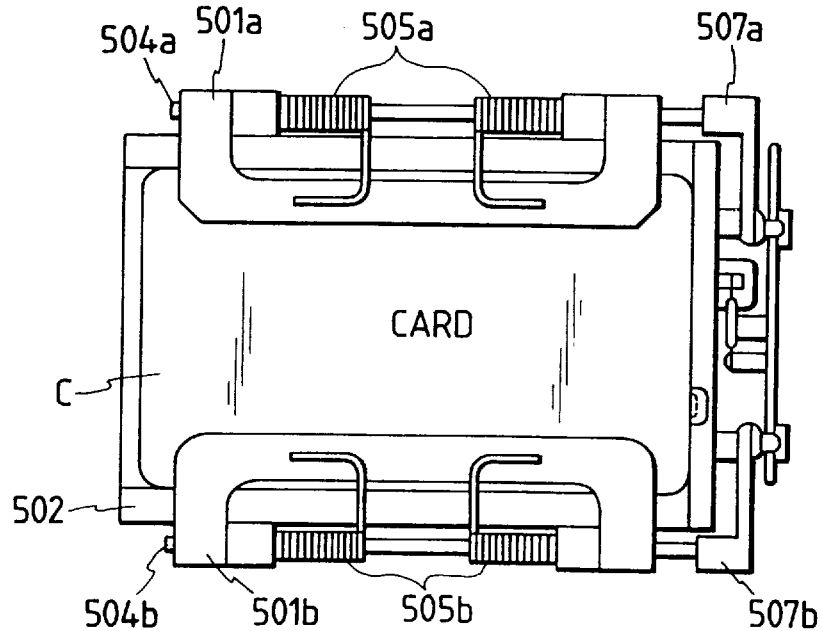
FIGS. 4A to 4C are drawings to show a conventional optical card holding mechanism.
Figure 4B:
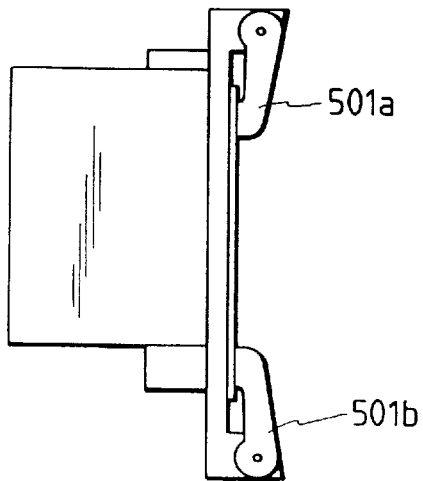
Figure 4C:
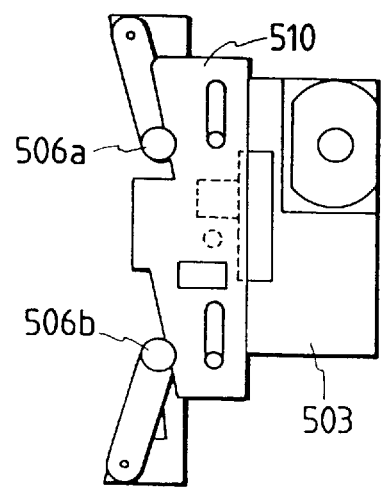
Figure 5:
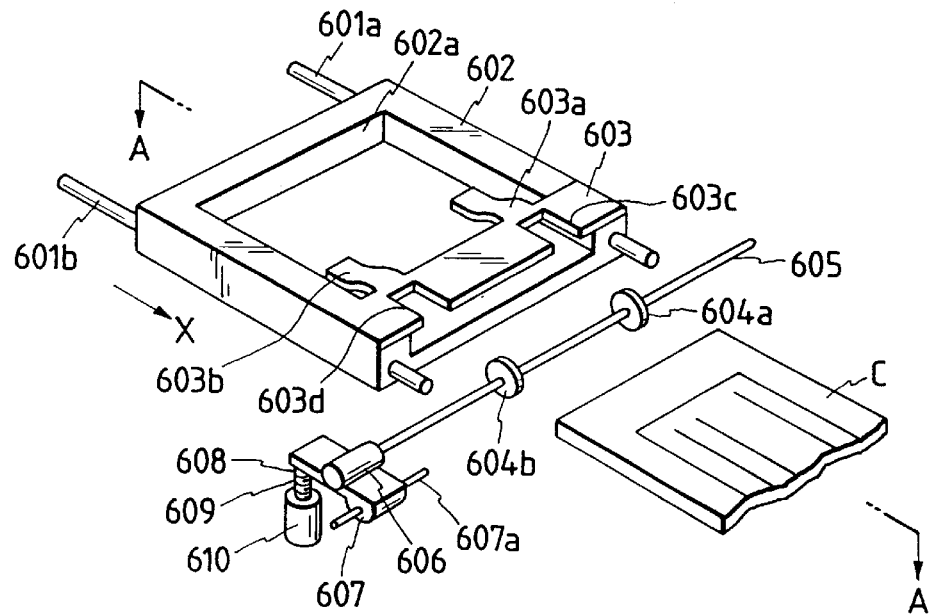
FIG. 5 is a diagrammatic perspective view of another conventional optical card recording/reproducing apparatus.
Figure 6A:
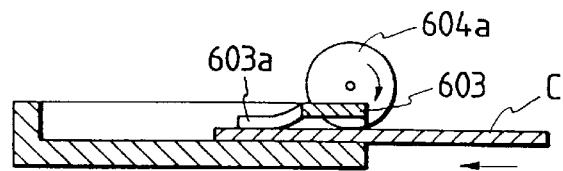
FIGS. 6A to 6C are drawings to illustrate the operation of the apparatus shown in FIG. 5.
Figure 6B:
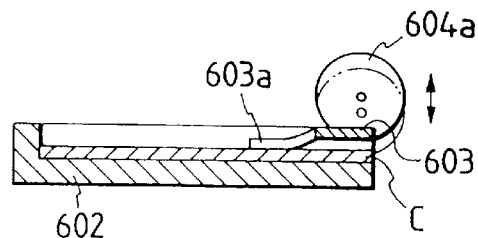
Figure 6C:
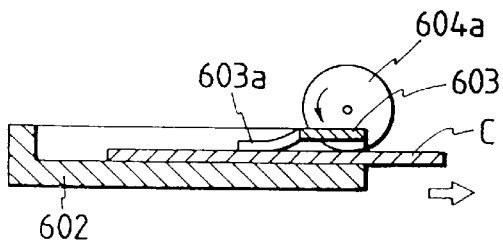
Figure 7:
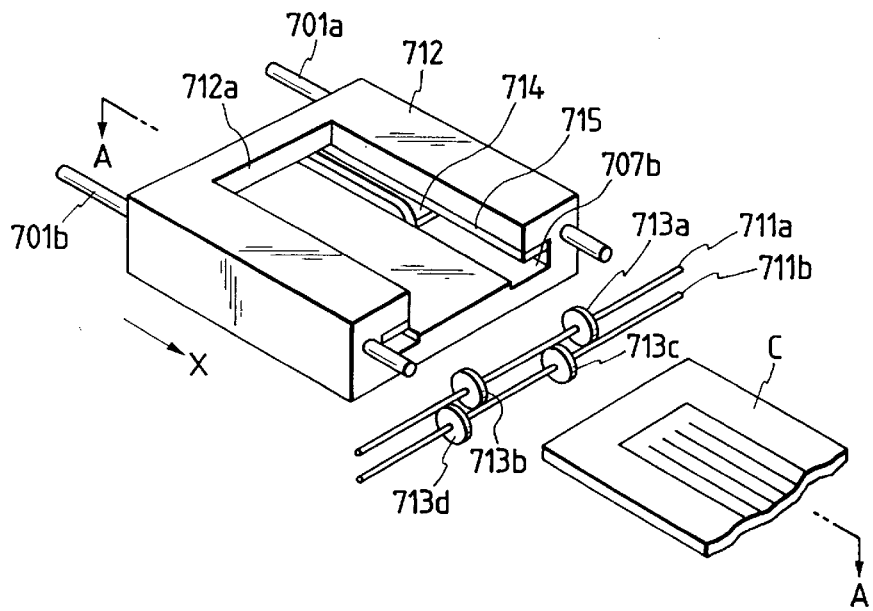
FIG. 7 is a schematic diagram of still another conventional optical card recording/reproducing apparatus.
Figure 8A:
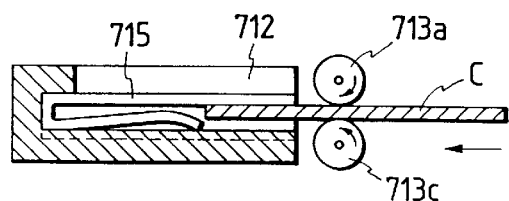
FIGS. 8A to 8C are drawings to illustrate the operation of the apparatus shown in FIG. 7.
Figure 8B:
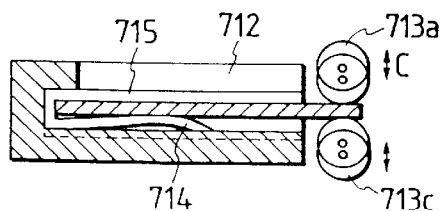
Figure 8C:
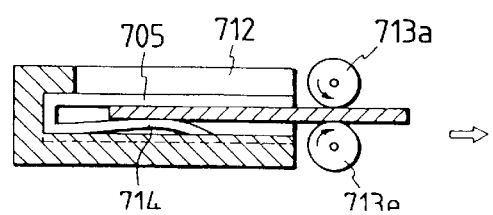
Figure 9:
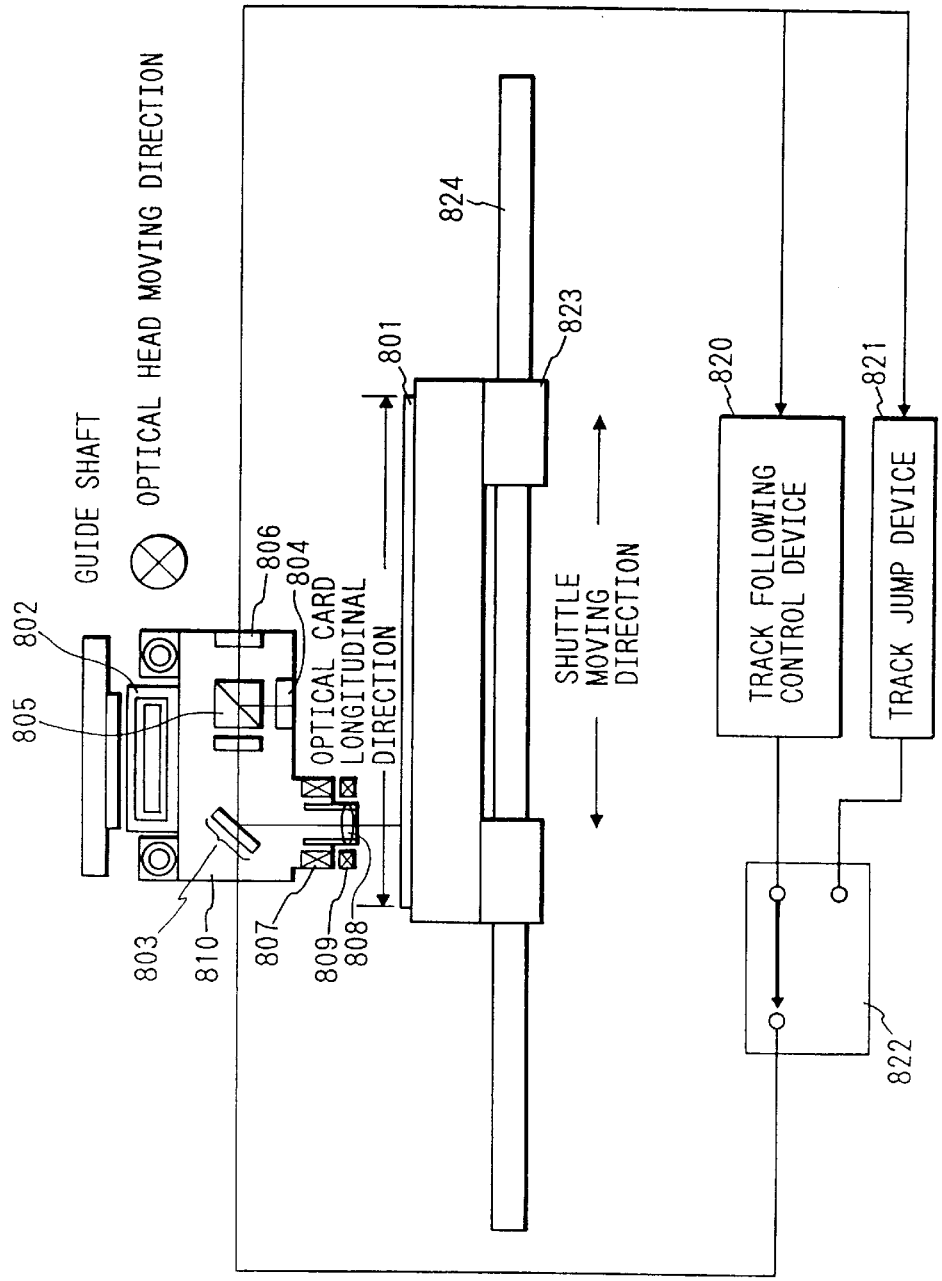
FIG. 9 is a block diagram to illustrate a control in a conventional optical card recording/reproducing apparatus.
Figure 12A:
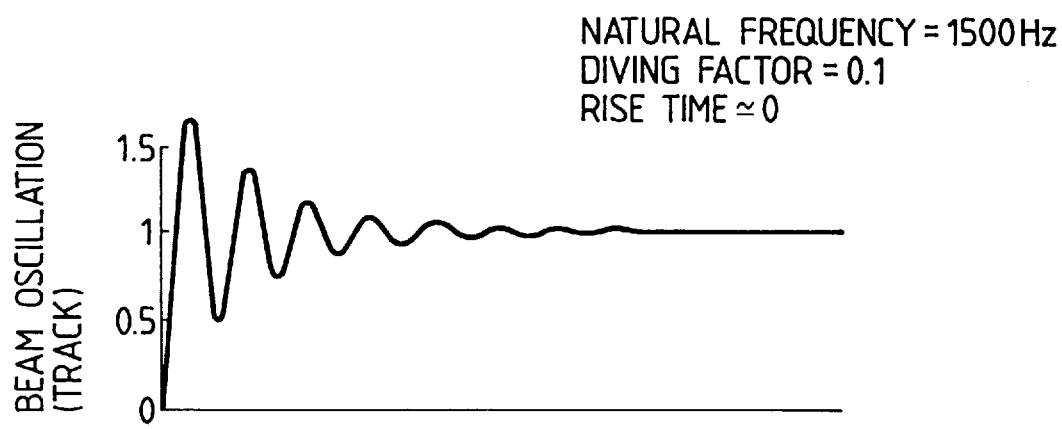
FIGS. 12A and 12B are waveform diagrams to show a beam signal to a track and a drive signal.
Figure 12B:
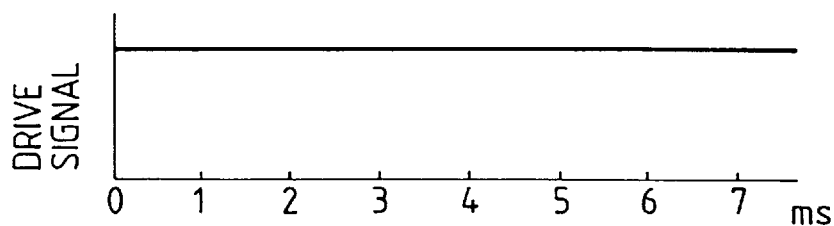
Figure 13:
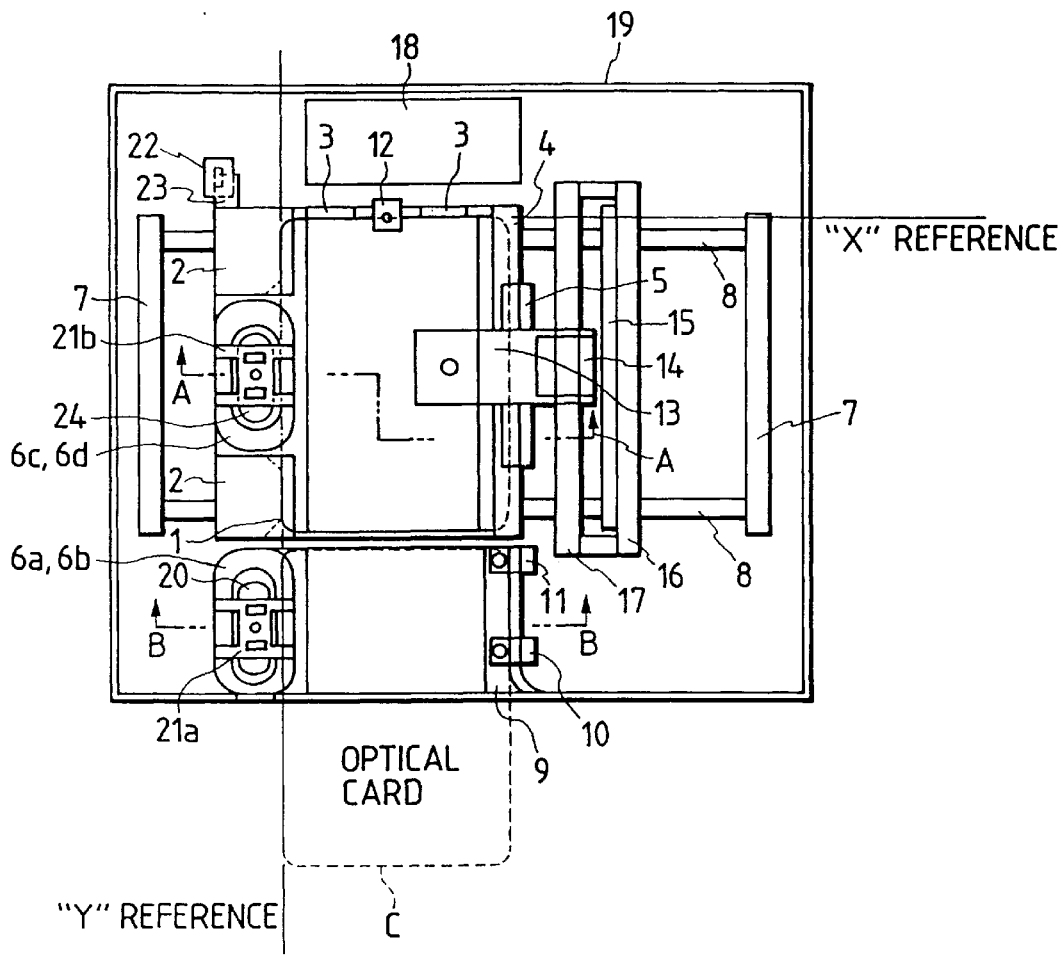
FIG. 13 is a diagrammatic plan view to show a first embodiment of information recording/reproducing apparatus according to the present invention.
Figure 14:
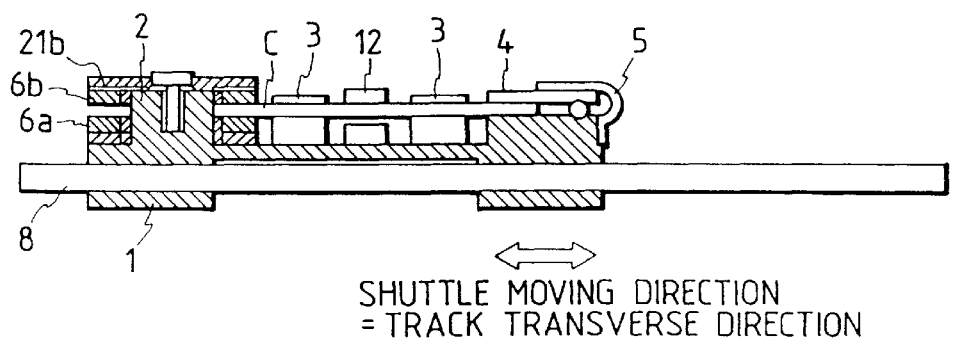
FIG. 14 is a cross section along A—A line in FIG. 13.
Figure 15:
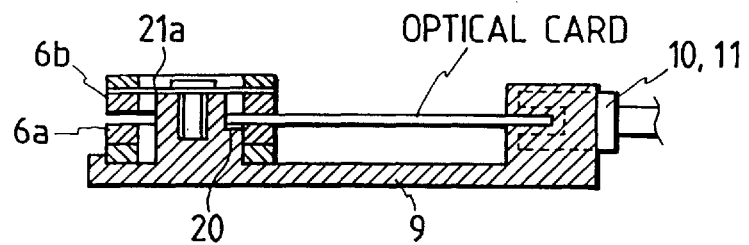
FIG. 15 is a cross section along B—B line in FIG. 13.

FIG. 13 is a plan view to show the scheme of the first embodiment, FIG. 14 is a cross section along A—A line in FIG. 13, and FIG. 15 is a cross section along B—B line in FIG. 13.

The present embodiment is characterized in that when an optical card C is inserted into a slot in the apparatus main body, a first transfer ultrasonic motor (USM) unit moves the optical card C on a transfer guide table 9 and in that a second transfer USM unit mounted on the shuttle 1 further carries the optical card C to a predetermined position in the shuttle 1. Also, a movement USM unit moves the shuttle 1 in intended movement directions.

Figure 16A:
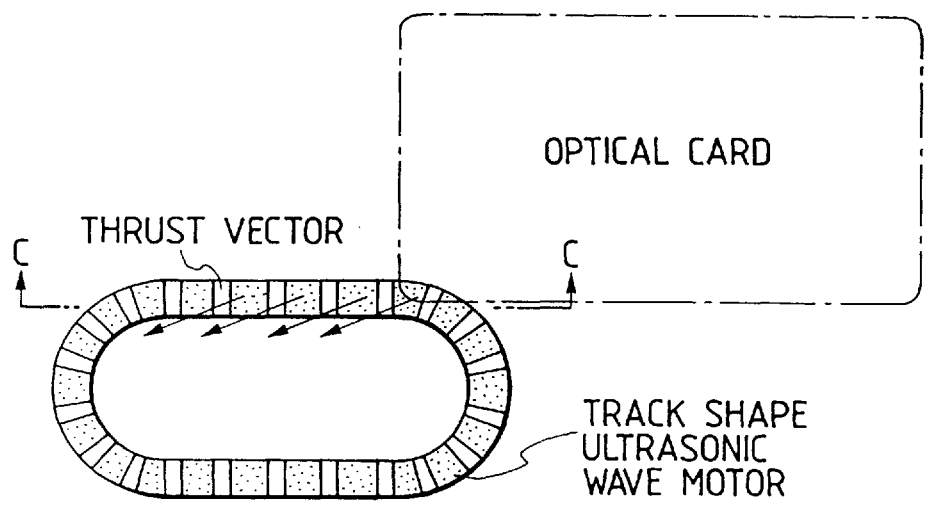
FIG. 16A is an enlarged view of an ultrasonic motor (USM) unit for optical card transfer as shown in FIG. 13.
Figure 16B:
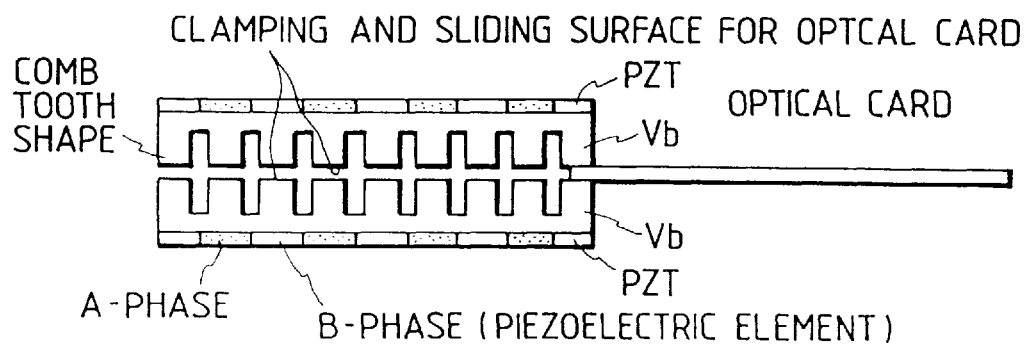
FIG. 16B is a cross section along C—C line in FIG. 16A.

The first and second USM motor units each have the shape of running track as shown in FIG. 16A, each of which is composed of a pair of oscillators (vibration members). Each oscillator is constructed such that one surface of elastic vibrator Vb is comb-shaped and a piezoelectric element PZT is bonded to the other surface. The pair of oscillators are vertically arranged as opposed to each other with a clearance through which the optical card C can pass between the comb-shaped portions as being drive surfaces. The piezoelectric element PZT is comprised of A-phase and B-phase piezoelectric segments for drive.

Also, the movement USM unit is constructed such that an oscillator (vibration member) is fixed on the back face of shuttle 1 and a drive surface of a one-side linear portion of the oscillator is kept in press contact with a rail stator extending in the intended movement direction. The USM units will be described in detail hereinlater.

In FIG. 13 and FIG. 15, reference numeral 9 designates a transfer guide table, which serves as a transfer guide in inserting the optical card C into the apparatus main body or in discharging it therefrom and which is fixed to a chassis 19 of an apparatus main body. Detection sensors 10, 11 for detecting the presence or absence of the optical card C are disposed at least on one side of the transfer guide table 9 along the longitudinal direction of optical card C. Also, the first transfer USM unit as described above is set on the other side in such a manner that a pair of oscillators 6a, 6b pinch the thickness of optical card C in the vertical direction.

A transfer projection 20 serving as a transfer guide of optical card C is provided on the other side of transfer guide table 9. The lower oscillator 6a and the upper oscillator 6b are fit to the transfer projection 20 therethrough.

The lower oscillator 6a is bonded to the transfer guide table 9 by an elastic adhesive. Also, a central portion of plate spring 21a is screwed onto a top surface of the transfer projection 20. The upper oscillator 6b is fixed to the periphery of the plate spring 21a. The plate spring 21a keeps the upper oscillator 6b with a gap to and in parallel with the lower oscillator 6a and applies a predetermined pressure for friction drive onto the optical card C pinched in the gap.

In FIG. 13 and FIG. 14, numeral 1 denotes a shuttle for positioning and holding the optical card C, which is set back of the transfer guide table 9. The shuttle 1 is arranged as movable in the intended movement directions from a card passing position of optical card C facing the transfer guide table 9. The intended movement directions are the directions perpendicular to the transfer direction of optical card C (the directions perpendicular to the longitudinal direction of optical card C or the directions perpendicular to a plurality of guide tracks formed on the optical card C).

Figure 18A:
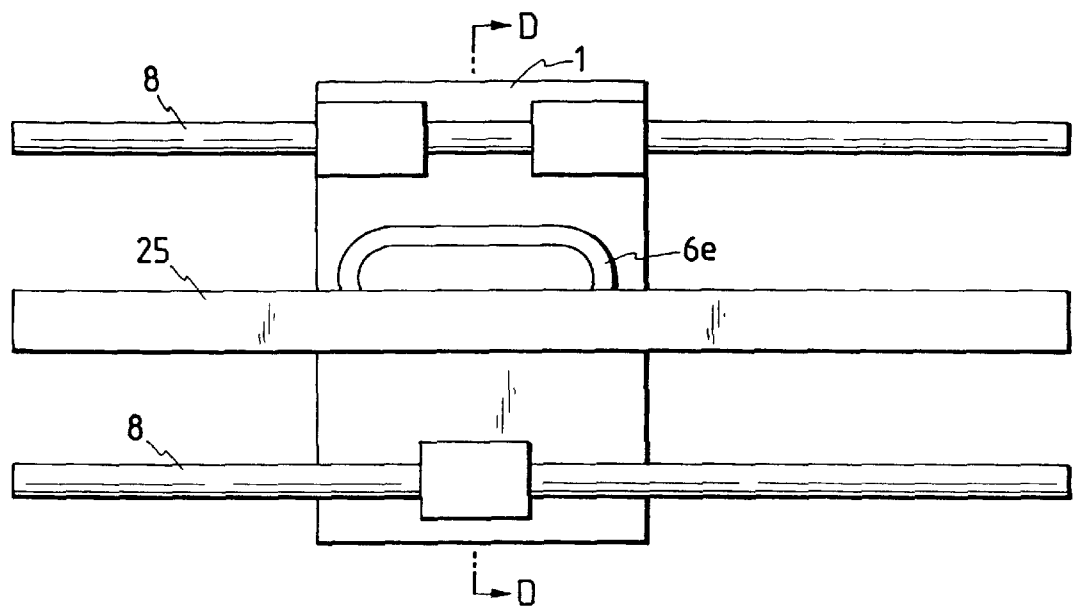
Figure 18B:
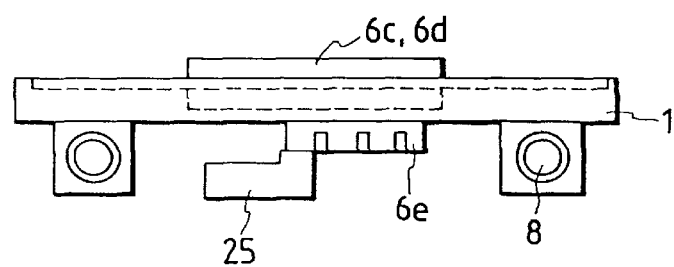
Figure 19A:
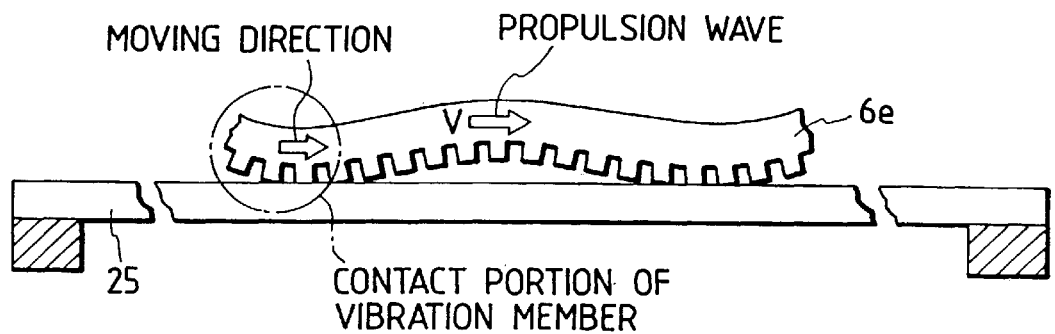
FIG. 19A is an illustration to show the principle of drive of the ultrasonic motor unit for shuttle movement as shown in FIG. 13.
Figure 19B:
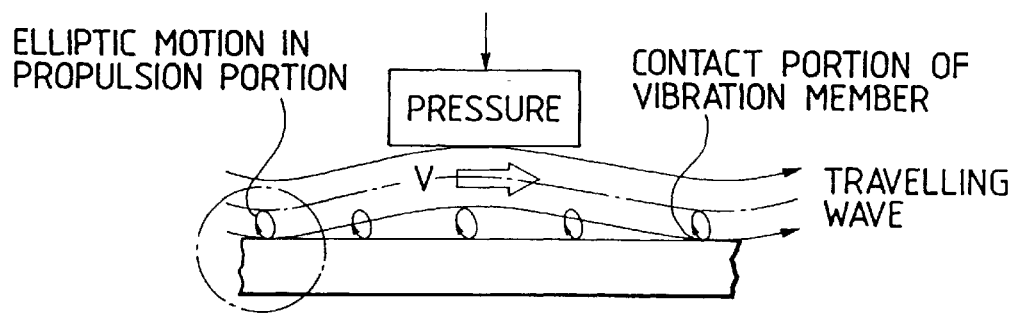
FIG. 19B is a detailed illustration of FIG. 19A.
Figure 19C:
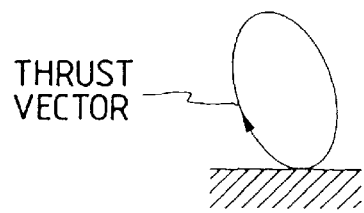
FIG. 19C is a detailed illustration of an elliptic motion.

An oscillator 6e in the above-described movement USM unit is mounted through an unrepresented pressure plate spring on the back face of shuttle 1, as shown in FIGS. 18A and 18B, so that the comb-shaped portion of the oscillator 6e is kept in press contact with the rail stator 25 fixed on the apparatus main body.

Numeral 22 is a photo sensor for detecting whether the shuttle 1 is set at the card passing position of optical card C, which is mounted on the apparatus main body. If the shuttle 1 is located at the card passing position, a shutter plate 23 attached to the shuttle 1 interrupts an optical path of the photo sensor 22, whereby the card passing position can be discriminated.

Figure 20A:
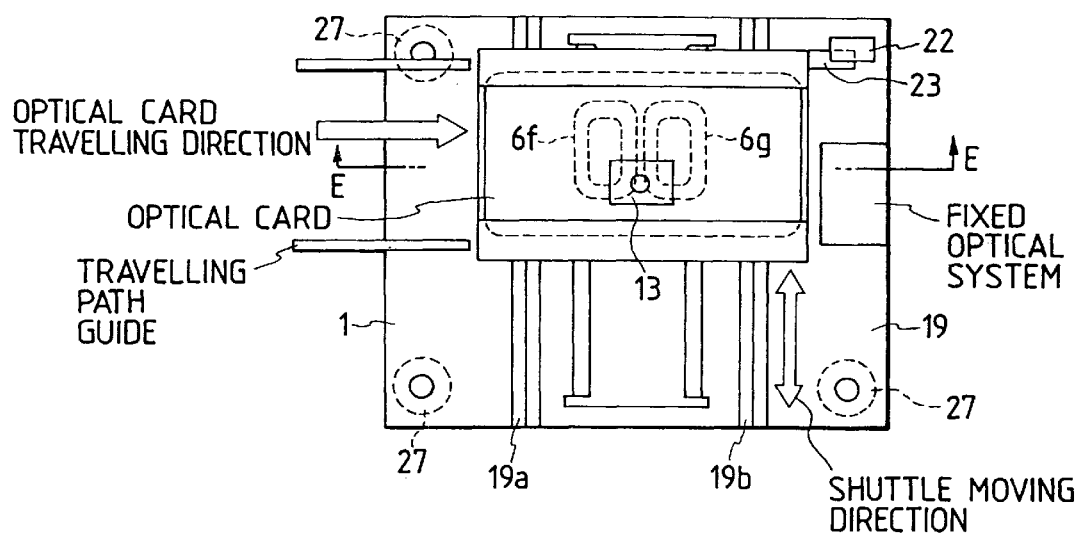
FIG. 20A is a drawing to show another embodiment of a shuttle moving mechanism.
Figure 20B:
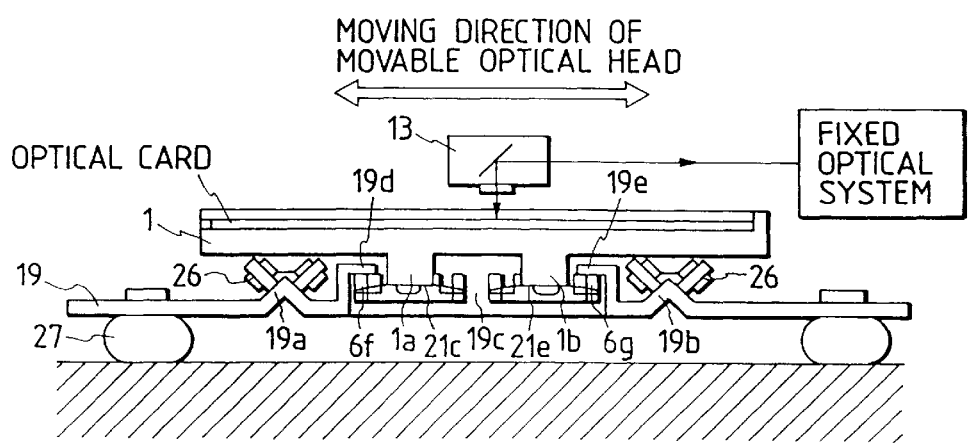
FIG. 20B is a cross section along E—E line in FIG. 20A.

Alternatively, the moving mechanism for shuttle 1 may be constructed in the arrangement as shown in FIGS. 20A and 20B.

In FIGS. 20A and 20B, numeral 19 denotes a body chassis supported by vibration-proof rubber 27, in which guide portions 19a, 19b of inverted-V shape are integrally formed along the intended movement directions of shuttle 1 (the directions perpendicular to the information tracks in the optical card C) and in which stator portions 19d, 19e of inverted-L shape are formed on both sides of an elongate hole 19c formed in the central portion.

Roller portions are provided on the back face of shuttle 1. Each roller portion is composed of a pair of rotators 26 contacting slanted surfaces of either guide portion 19a, 19b. For example, two roller portions are provided for one guide portion 19a, while one or two roller portions are provided for the other guide portion 19b, whereby the guide portions 19a, 19b support the roller portions at least at three points.

Also, a pair of projections 1a, 1b are formed on the back face of shuttle 1 such that they are located in the elongate hole 19c in the body chassis 19 and near the stator portions 19d, 19e. Oscillators 6f, 6g in movement USM unit each are set through plate springs 21c with its drive surface facing upward to the projection 1a, 1b, so that outer linear portions of the oscillators 6f, 6g are kept in contact with the back face of the stator portions 19d, 19e. These plate springs 21c can keep the shuttle 1 and the body chassis 19 in press contact through the roller portions and the guide portions, so that the drive surfaces of oscillators 6f, 6g are kept in press contact with the stator portions 19d, 19e, whereby the shuttle 1 can be moved without backlash.

Mutually opposite traveling waves are formed in the pair of oscillators 6f, 6g to produce a thrust in the same direction.

Returning to FIG. 13, an optical card loading portion of shuttle 1 is provided on one side with a press plate 4 for pressing the longitudinal periphery of the optical card through a plate spring 5 as extending in the longitudinal direction of shuttle 1. Also, guide groove portions 2 are integrally formed at front and back ends of shuttle 1 in the longitudinal direction thereof and on the other side in order to position the longitudinal side of optical card and to permit it to slide. Further, the lower oscillator 6c in the second transfer USM unit is bonded to the shuttle nearly in the middle between the guide groove portions 2 formed in the shuttle 1, as shown in FIG. 14, in the same manner as the lower oscillator 6a in the first transfer USM unit. An optical card holding surface of the lower oscillator 6c is set in parallel with the plane of the guide groove portions 2 and at the same height or slightly higher than the plane of guide groove portions 2. The upper oscillator 6d is set above the lower oscillator 6c as opposed thereto. The upper oscillator 6d is mounted on the top surface of projection 24 integrally formed with the shuttle 1, through a support spring 21b in the same manner as the upper oscillator 6b in the first transfer USM unit.

Accordingly, the oscillators 6c, 6d are parallel to each other and are set on the shuttle 1 with a gap as being capable of pinching the optical card.

Further, the shuttle 1 has projections 3 as positioning contact portions on the shorter side of optical card C to control the position in the longitudinal direction of optical card C. An optical card detection sensor 12 is provided for detecting the optical card at a contact surface thereof to the projections 3.

Bearings or rollers are provided on the back side of shuttle 1 in the above arrangement to slidably support at least two guide shafts 8, though not shown. Further, a drive source such as an ultrasonic motor is set for driving the shuttle 1. Although not shown, a detector for detecting the position and the velocity is set on the back side of the shuttle 1 and a linear scale is fixed as opposed to the detector in parallel with the guide shafts 8 and on the body chassis 19.

The guide shafts 8 are fixedly supported in parallel with the direction perpendicular to the card insertion direction and in a horizontal state by shaft holders 7 supported by the body chassis 19.

The body chassis 19 also supports an optical head portion 13, in the same manner as the shuttle 1, as movable in the Y-direction in FIG. 13, that is, along tracks in the optical card, relative to the recording surface of the optical card loaded in the shuttle 1. The optical head portion 13 is provided with an actuator for a fine drive for focusing or tracking with an objective lens for focusing an optical beam on the card recording surface, a lift mirror and a magnetic coil 14 for Y-directional drive as described. The magnetic circuit is supported on the body chassis 19 and is constructed as follows. The magnetic circuit is composed of an outer yoke 16, a permanent magnet 15 and an inner yoke 17. The inner yoke 17 is set through the inside of magnetic coil 14 with a clearance. Further, an outer surface of magnetic coil 14 is opposed to the permanent magnet with a clearance. The inner yoke 17 and the outer yoke 16 are connected to each other at their ends in the moving directions of the optical head portion 13 to form a magnetic loop.

Fixed to the body chassis 19 are a light source for supplying a beam to the optical head 13 and a detector for detecting reflected light from the optical card C. Accordingly, the moving optical head 13 is arranged to focus an optical beam on the recording surface of optical card C and to form information recording pits in the recording area in optical card C, while a fixed optical system 18 is arranged to generate the beam by a separate optical system fixed on the body chassis 19 and to detect the reflected beam, and is provided with a semiconductor laser as a light source, a collimator lens, a beam shaping prism, a polarization beam splitter, a quarter-wave plate and a detector, though not shown.

The operation is next described referring to FIG. 13, FIG. 14, and FIGS. 16A to 16C for the embodiment of the present invention as so arranged.

Figure 17A:
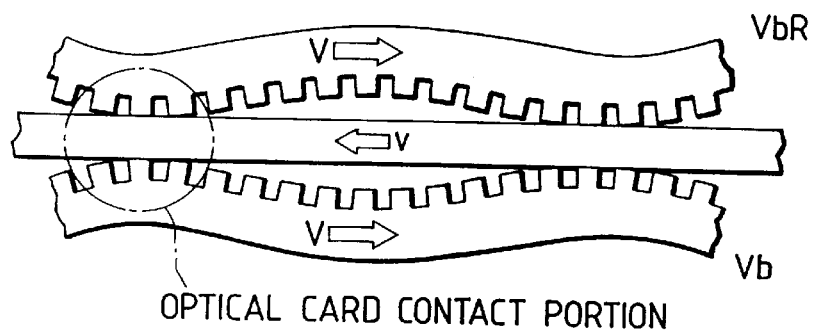
FIG. 17A is an illustration to show the principle of drive of the ultrasonic motor unit for optical card transfer in FIG. 13.
Figure 17B:
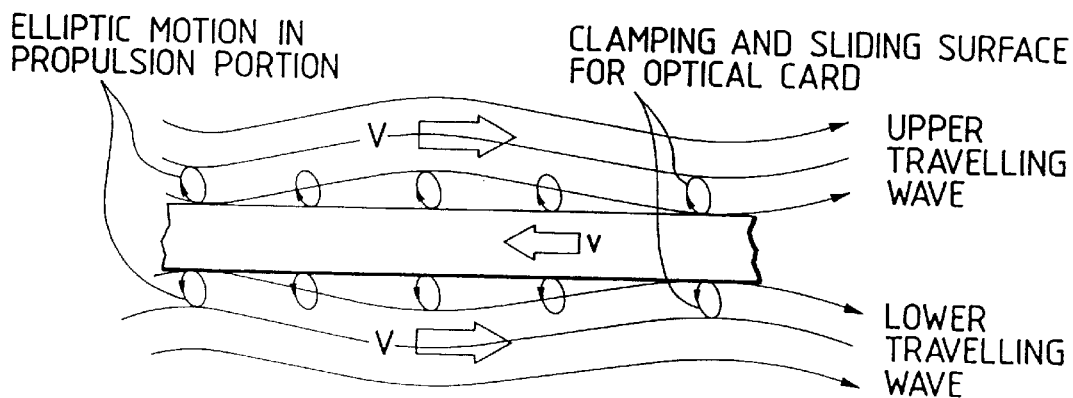
FIG. 17B is a cross section along C—C line in FIG. 17A.

When the optical card C is inserted into the apparatus, it is detected by the card detection sensor 10 set on the transfer guide table 9. With this detection signal, a drive voltage start is instructed to the oscillators 6a, 6b in the first transfer USM unit. As shown in FIGS. 16A, 16B and FIGS. 17A, 17B, the oscillator Vb has the piezoelectric element with A-phases and B-phases being alternately arranged on the bottom face of the comb portion. When a voltage is applied to the A-phases in the piezoelectric element and a voltage with a phase difference of 90° is applied to the B-phases, traveling waves are produced by a combination of vibrations of the phases. It is known that with the traveling waves an elliptic motion having an inclination relative to the wave front of traveling waves as shown in FIG. 17B appears opposite to the propulsive wave in the comb portions of card holding surfaces. Thus, in the embodiment, such oscillators of USM are vertically arranged while matching the thrust direction with each other by oscillating them with opposite thrust A waves and B waves. This is described in Japanese Laid-open Patent Application No. 2-209341. The optical card is transferred in the direction of thrust appearing in the card holding portion of USM. Namely, the optical card C is urged against the Y-reference side wall of transfer projection 20 in the transfer guide table 9 in FIG. 13 and is carried toward the X reference at the deep end of shuttle 1.

When the optical card passes by the detection sensor 11, a signal from the sensor causes a drive voltage V to be applied to the oscillators 6c, 6d in the second transfer USM unit fixedly mounted on the shuttle 1. The optical card moves along the guide groove portion 2 in the shuttle 1 as urged by the press plate 4 and the spring 5, and then is pinched by the oscillators 6c, 6d. Similarly as the above transfer, the optical card C moves toward the projections 3, which are the contact positioning surfaces at the deep end of shuttle 1, as the longer side of optical card is urged against the guide groove portion 2. On the way, the rear end of optical card C leaves the detection sensor 10, and the oscillators 6a, 6d in the first transfer USM unit are stopped at that timing.

When the optical card C reaches the end projections 3 of the shuttle 1, the detection sensor 12 detects the position of optical card C and the drive of oscillators 6c, 6d in the second transfer USM unit mounted on the shuttle 1 is stopped. In summary, the oscillators 6c, 6d move the optical card to urge it against the guide groove portion 2 as being the Y-reference surface for the longer side, before the optical card is stopped by the projections 3 as being the X-reference surface, whereby the optical card is positioned relative to the shuttle 1.

Subsequently, with the detection by the card position detection sensor 12, the drive voltage V is applied to the oscillator 6e in the movement USM unit to start moving the shuttle 1 in the direction perpendicular to the information tracks in the optical card. The shuttle 1 is controlled through the bearings to move along the guide shafts 8. When the thrust of oscillator 6e is transmitted to the rail stator 25 in the direction perpendicular to the information tracks in optical card as shown in the principle of operation in FIGS. 19A to 19C, an elliptic thrust vector appears opposite to the propulsive wave similarly as described above. However, since the stator 25 is fixed in this case, a reaction force works against the thrust vector in the contact portions to move the shuttle 1 in the same direction as the propulsive wave moves.

The shuttle 1 is driven as described above, and is reversed by changing over the direction of traveling waves properly, whereby the shuttle 1 is moved to and fro in the directions perpendicular to the longitudinal direction of optical card C.

Inversely, the shuttle 1 can be moved in such an arrangement that the stator 25 is fixed on the shuttle 1 and the oscillator in the USM is placed on the body chassis 19. The moving velocity and position control of shuttle 1 is effected by controlling the drive of shuttle with output signals given by a linear encoder and a linear scale.

The shuttle control device position-controls the recording surface of the optical card at a desired position of optical card C. An optical beam supplied from the fixed optical system is guided through the aforementioned optical system to the condenser lens in the movable optical head 13 located at a position where it is opposed to the recording surface. Thus, the optical beam irradiates the recording surface of optical card C. The condenser lens is position-controlled in the focusing drive and in the tracking drive by the actuator for the movable optical head 13 so as to keep the beam focused on the recording surface as keeping the beam tracing a forming track, while information is recorded or reproduced. Also, the shuttle 1 is jumped to another information track at a desired position by the seek drive for moving the shuttle 1 by the oscillator 6e in the movement USM unit.

The focusing and tracking can be conducted by ordinary detection methods among various conventional suggestions. For example, the focusing can be made by the astigmatic method using a quarterly divided detector, and the tracking by the three-beam method using a bisectional detector for comparing two reflection beams from two tracking beams. After information is recorded or reproduced with the optical card as described above, the shuttle 1 is moved to the card passing position being the initial position. The position is detected by the photo sensor 22 and then the drive of oscillator 6e in the movement USM unit is stopped. After this stop, the shuttle 1 is kept at the stop position by frictional resistance between the oscillator 6e and the stator 25 as described above. Further, the oscillators 6c, 6d on the shuttle 1 are driven substantially at the same time as this operation to discharge the optical card C from the shuttle 1. When the optical card C reaches the detection sensor 11, the oscillators 6a, 6b in the first transfer USM unit are driven and the drive is stopped when the photo sensor 11 detects the rear end of optical card C.

In the above arrangement, the recording/reproducing operation is started in the card recording area by the fixed optical system 18 and the moving optical head 13, and then the shuttle 1 is moved to look for a desired information track. After the tracking servo position-controls the movable optical head 13 on an aimed track, the magnetic linear motor (voice coil motor) linearly moves the optical head along the information track to record or reproduce desired information in the information track. It is of course that the movable optical head 13 is provided with an inversion sensor for inverting the moving direction of the head in accordance with the recording length of information tracks.

Figure 21:
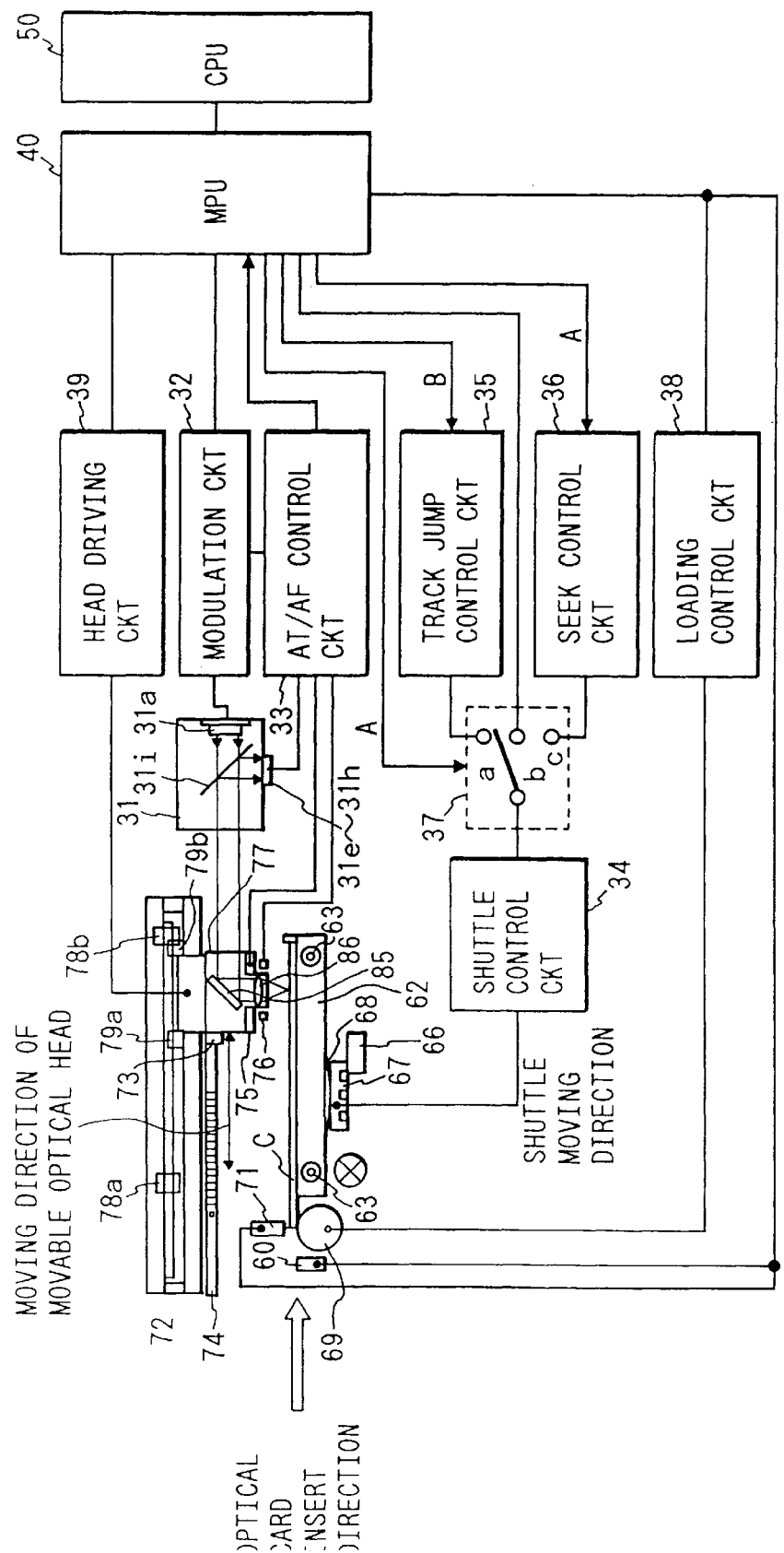
FIG. 21 is a diagrammatic illustration to show a second embodiment.

FIG. 21 to FIG. 24 show the second embodiment. In FIG. 21, an optical card C is inserted through an unrepresented slot, which is detected by an optical card detector 60. An output signal from the detector 60 is input into MPU 40, which drives a transfer motor 69 through a loading drive circuit 38 to move the card into the shuttle 62 by unrepresented transfer rollers. A photodetector 71 is provided for confirming the positioning end of optical card C at a contact portion in the longitudinal direction of shuttle 62. A detection signal of the photodetector 71 is input into the MPU 40 to determine the end of movement of optical card C into the shuttle 62. As shown in FIGS. 23A and 23B, pre-formatted guide tracks are formed at equal intervals and in parallel with each other along the card longitudinal direction in the optical card C. The optical card C has information track portions as information recording/reproducing area between the guide tracks.

Numeral 77 designates a movable optical head, which is arranged to move to and fro along a guide track formed in the longitudinal direction on the optical card and to irradiate an optical beam onto the optical card. Numeral 75 denotes an AF actuator for autofocusing, which drives a condenser lens 86 in the movable optical head 77 in the Z-direction to focus an optical beam spot on the optical card C. Numeral 76 is an AT actuator for autotracking, which drives the condenser lens 86 in the directions perpendicular to the guide tracks.

The movable optical head 77 is composed of the condenser lens 86, the AT and AF actuators 75, 76 and a reflecting mirror 85 for reflecting a beam toward the condenser lens 86. A fixed optical system 31 is arranged separate from the movable optical head 77 such that it can supply an optical beam or detect a reflection beam through the reflecting mirror 85 in the movable optical head 77. As shown in FIG. 22, the fixed optical system 31 has an optical block system including a semiconductor laser 31a as a light-emitting source, a collimator lens 31b, an optical beam shaping prism 31c, a diffraction grating 31d and an astigmatism condenser lens 31e, AT photodetectors 31f, 31g, an AF photodetector 31h, and a beam splitter 31i.

Numeral 72 is a magnetic circuit for moving the movable optical head 77 along the pre-formatted guide tracks on the optical card. Numeral 73 represents a linear encoder attached to the movable optical head 77, which detects reflected light or transmitted light from a pitch slit portion of linear scale 74 disposed along the moving direction of the movable optical head 77 and then outputs a detection signal to the MPU 40.

Numeral 39 is a drive circuit for movable optical head 77, which controls a moving velocity of movable optical head 77 through the MPU 40 in accordance with the detection signal from the linear encoder 73. Also, there are optical detection sensors 78a, 78b disposed at selected positions on both ends for discrimination of position inversion in correspondence with the recording and reproduction region in optical card C. Shielding plates 79a, 79b are attached to the moving head 77 to generate an H or L level signal upon interruption of associated sensor. With the generation of H or L level signal, the MPU 40 actuates the head driving circuit 39 to move the movable head 77 to and fro along the guide track thereon similarly as described above.

Figure 23A:
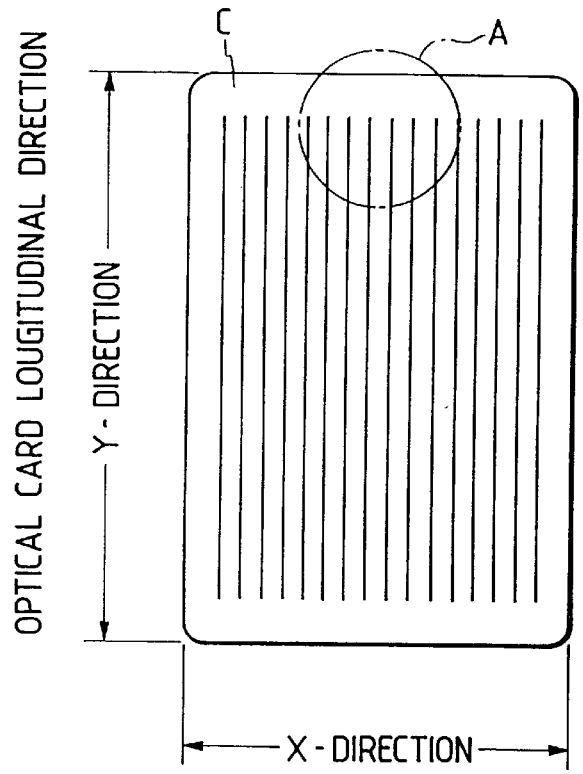
FIG. 23A is a drawing to show a recording/reproducing surface of an optical card.
Figure 23B:
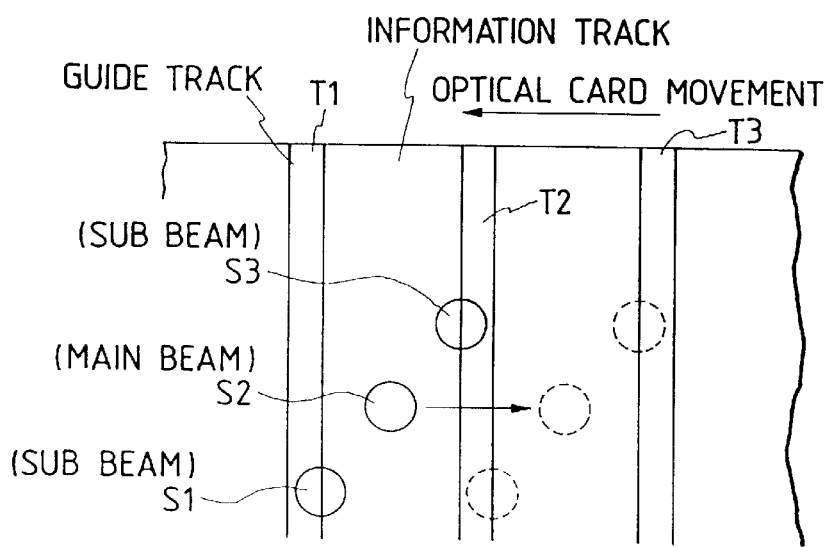
FIG. 23B is an enlarged view of portion A in FIG. 23A.

Next described with FIG. 22 is an optical path for shaping an optical beam. An optical beam is emitted from the semiconductor laser 31a mounted in the fixed optical system 31. The optical beam enters the collimator lens 31b to be collimated thereby. The collimated beam is shaped by the optical beam shaping prism 31c to have a predetermined intensity distribution. Then the shaped beam enters the diffraction grating 31d. The diffraction grating 31d splits the beam into three effective beams (zeroth order and ± first order diffracted light beams). These three beams are incident into the beam splitter 31i to travel straight therethrough. The beams then impinge on the reflecting mirror 85 set on the movable optical head 77 to be reflected 90° toward the condenser lens 86. The condenser lens 86 focuses the beams to form fine spots of optical beams on the optical card C. As shown in FIG. 23b, beam spots S1, S3 are located on respective guide tracks and a beam spot S2 on an information track between the guide tracks as arranged at equal pitch and in parallel with each other. After the optical beams are projected onto the optical card C through the optical beam irradiation path as described they are reflected by the optical card C then to go into a reflection path. The reflected beams pass through the condenser lens 86 and then are reflected by the reflecting mirror 85 to change the traveling direction by 90°. Then the beams travel straight into the beam splitter 31i in the fixed optical system 31 to be reflected thereby. The reflected beams are condensed by the astigmatism condenser lens 31e onto the photodetectors 31f, 31h, 31g as shown in FIG. 22. The photodetectors detect a ratio of light quantity of the beams. Outputs from the photodetectors 31f, 31h, 31g are supplied to a modulation/demodulation circuit 32, which demodulates read information and transfers it to the MPU 40.

Figure 24:
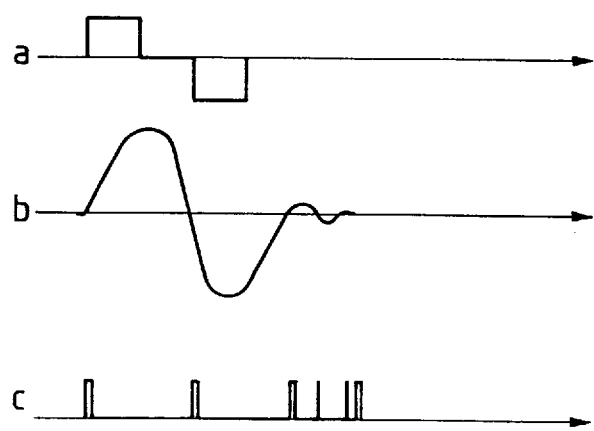
FIG. 24 is a drawing to show an error signal obtained in AT control system, and an output waveform of an zero-cross.

Also, the modulation/demodulation circuit 32 modulates an information signal sent from the MPU 40 and controls the semiconductor laser 31a in accordance with the thus modulated signal to record information on an information track in optical card C through the above-described optical path. The AT control is conducted as follows. First, the bisectional photodetectors 31f, 31g detect that the beam spot S1 is located on one of the guide tracks as pre-formatted in parallel with each other with information tracks inbetween and that the beam spot S3 is on a next guide track, as shown in FIG. 22. Output signals from the photodetectors 31f, 31g are supplied through the modulation/demodulation circuit 32 to the AT control circuit 33. An acceleration pulse and a deceleration pulse as shown in b in FIG. 24 are supplied to the AT actuator 76, so that a relative moving velocity is decreased between the beams and the guide tracks to execute pull-in of AT control.

Since the present invention is not directed to the AF control, the details of AF control are omitted to explain herein. Briefly describing, the present invention employs the astigmatic method as is well known, in which signals of diagonal sums of the quarterly divided photodetector 31h are detected and a difference between the sum signals is used as an AF control signal. The shuttle 62 is supported by two shafts 63 movable in the directions perpendicular to the guide tracks in the optical card C loaded thereon. An oscillator 67 in the movement USM unit is mounted through a plate spring 68 on the back face of shuttle 62 in the same manner as in the embodiment shown in FIG. 18. A guide plate 66 is a stator in press contact with the oscillator 67 and is arranged in parallel with the shaft 63 and in the direction perpendicular to the tracks in optical card C.

Numeral 34 is a shuttle drive circuit for driving the oscillator 67 in the USM through a switch 37 under instruction from MPU 40. The switch 37 has changeover contacts a, b, c through which a track jump start signal is supplied from an unrepresented instruction circuit in MPU 40 under instruction of CPU 50, through which a stop signal is supplied to stop the drive of shuttle drive circuit 34 when a zero-cross signal of AT error signal as described later is detected and input into MPU 40, and through which a seek start signal is input into MPU 40 to move a beam spot from a presently following track to another desired track (seek operation).

The above seek operation is carried out as follows. The switch 37 is changed over from the contact b to the contact c, based on an instruction from CPU 50. Then, MPU 40 supplies Hi and Lo signal A of seek start signal as shown in FIG. 26D to the shuttle drive circuit 34. Also, an ultrasonic motor (USM) drive voltage in FIG. 26C is applied to the oscillator 67 to move the shuttle 62. In the USM drive continuous pulses as shown in FIG. 26C, Vi represents the amplitude of drive voltage, which is generated during Hi level of the signal A.

Moving the shuttle 62 as described above, an AT error signal is generated as a difference signal of the photodetectors 31f, 31h when the beam spots cross guide tracks, as shown in FIGS. 26A and 26B. The AT control circuit 33 detects a zero point of the difference signal through the optical system, and a zero signal is input into MPU 40 to obtain a binarized track transverse signal as shown in FIG. 26B. The CPU 50 compares a set track number with a number of zero signals counted by a zero signal counter to discriminate a number of crossed tracks.

In the present embodiment, to take the optical beam scanning along a track to an aimed track, the CPU 50 sets a number of tracks between the presently following track and the aimed track and subtracts one from the target track number. From the calculation result, the CPU 50 counts down every fall in the track transverse signal in FIG. 26B and stops the seek operation when the difference reaches zero between them. Thus, the seek operation is ended at a zero-cross one before the aimed track and the rest of one track is rendered to the track jump drive as described later to position the optical beams. As described, the track transverse signal is compared with the set track number in CPU 50 and a moving distance is calculated. The track transverse velocity is detected from the time needed for movement, and the result is supplied to the seek control circuit 36 for setting an aim velocity. The switch 37 is changed over by a signal selected by the instruction circuit in MPU 40 under instruction of CPU 50 to effect connection with each drive circuit.

Figure 25:
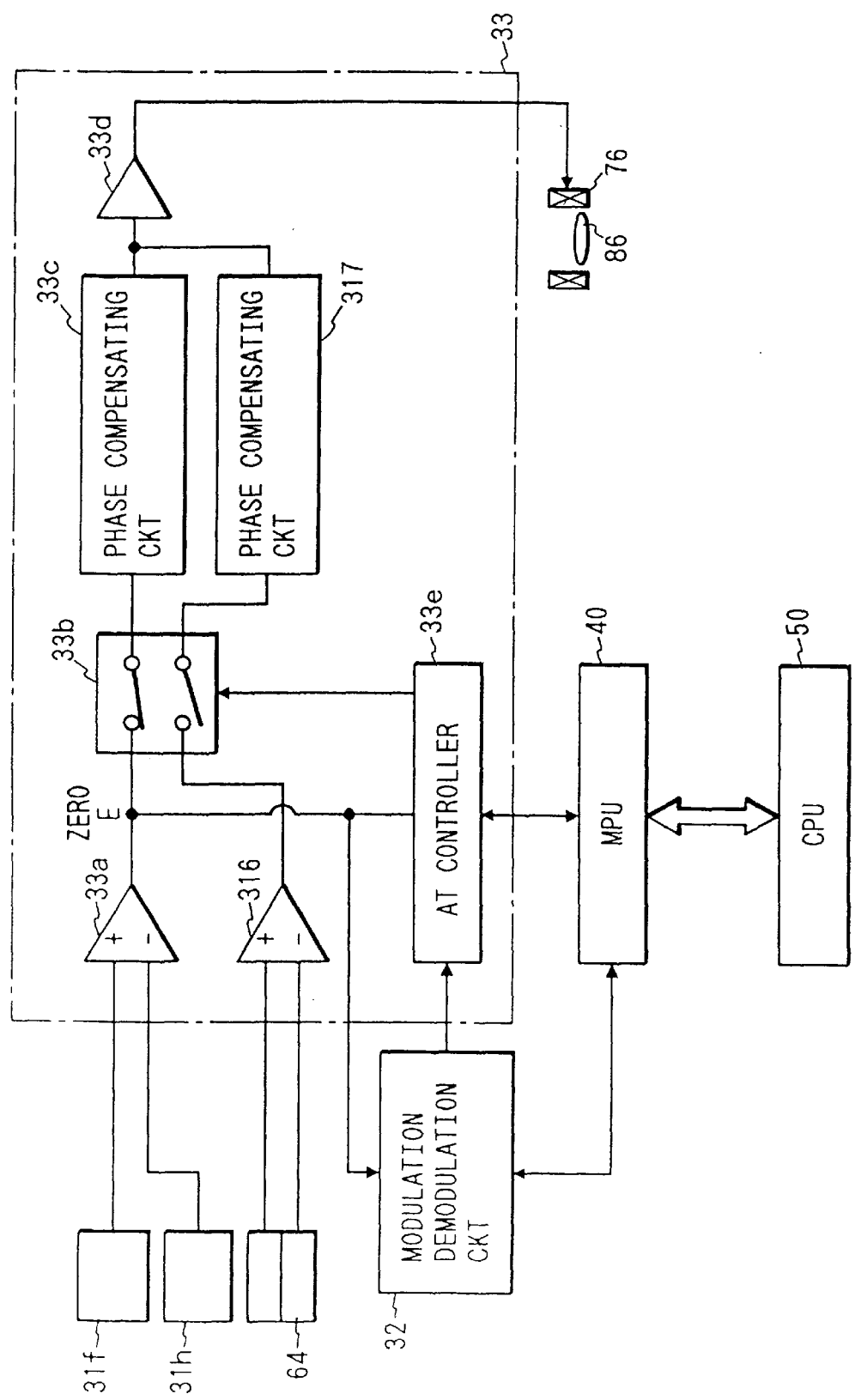
FIG. 25 is a block diagram of AT control system.

The above AT error signal is a difference signal detected by the bisectional photodetectors 31f, 31g as comparing the reflected beams when the beam spots S1, S3 come to drop on the guide tracks. This difference signal is input through the modulation/demodulation circuit 32 into the AT control circuit 33. In the AT control circuit 33 shown in FIG. 25, the signal is made to pass through a subtraction circuit 33a, a switch 33b and a phase compensating circuit 33c. Then a drive circuit 33d generates acceleration and deceleration pulses to keep the AT error signal E equal to zero. The AT controller 33e detects a zero-cross point obtained in driving the AT actuator 76 and controls it. In FIG. 24, symbol b represents acceleration and deceleration pulses, symbol c an AT error signal, and symbol d a zero-cross signal.

The track jump operation is next described.

A track jump control circuit 35 is provided with an ON and OFF pulse generator, which outputs a signal B of Hi and Lo levels as shown in FIG. 27C. This signal B is input into the shuttle drive circuit 34 and an ON and OFF drive voltage as shown in FIG. 27B is supplied from the shuttle drive circuit 34 to the oscillator 67 to finely move the shuttle 62 with mincing steps. In the ON and OFF drive voltage shown in FIG. 27B, ti represents ON time of drive voltage and Δt OFF time of drive voltage. Further, Vi represents the amplitude of drive voltage at the ON time. Thus finely moving the shuttle 62, the beam spots S1, S3 shown in FIG. 23B gradually approach next two guide tracks and finally come to drop on the guide tracks, whereby a zero-cross is detected. This zero signal is transmitted through MPU 40 to CPU 50. According to judgment of CPU 50, the instruction circuit in MPU 40 generates a stop signal b to release the track jump start signal in switch 37 and to change the switch from contact a to contact b, stopping the supply of drive voltage to the shuttle drive circuit 34.

The operation is next described based on the present embodiment.

The optical card C is input through an unrepresented slot and then is detected by the optical card detector 60. An output signal from the detector is supplied to MPU 40. Then the transfer motor 69 is driven through the loading drive circuit 38 to move the optical card to the shuttle 62 by unrepresented transfer rollers. When the photodetector 11 detects that the optical card is positioned at the contact portion in the longitudinal direction of shuttle 62, a detection signal from the photodetector is input into MPU 40 to determine the end of movement of optical card C into the shuttle 62. The quarterly divided photodetector 31h detects the focus condition of reflected light of the beam spot S2, which is guided through the condenser lens 86 in the movable optical head 77 onto the optical card C loaded and positioned on the shuttle 62. After the photodetector 31h detects an in-focus state of reflected beam, a track jump start signal is sent through MPU 40 to the shuttle drive circuit 34 under instruction of CPU 50 to change over the switch 37 from contact b to contact a. Then the track jump control circuit 35 generates the signal B shown in FIG. 27C to the shuttle drive circuit 34, which outputs the ON and OFF drive voltage in FIG. 27B to the oscillator 67 to finely move the shuttle 62. Thus, the tracks, which are formed along the longitudinal direction of optical card C loaded on the shuttle 62, move in the direction perpendicular to the optical beams waiting at the inversion position of the movable optical head 73.

With this movement, the beam spots S1, S3 come to drop on initial guide tracks T1, T2 in optical card C as shown in FIG. 23B, while the beam spot S2 on an information track.

Reflected light of the beams is guided through the optical system shown in FIG. 22 and then through the modulation/demodulation circuit 32 to be detected by the AT control circuit 33. A zero-cross in obtained AT error signal is sent through MPU 40 to CPU 50 and the instruction circuit in MPU 40 selects a stop signal at the same time. It changes over the switch 37 from contact a to contact b to stop the track jump control circuit 35 and to stop the drive voltage of the shuttle drive circuit 34. With the drive a self holding force acts because of the pressure between the oscillator 67 and the guide plate 66 as described above, whereby the shuttle 62 can be fixedly held in the stationary state.

In this stationary state the movable optical head 73 is moved through the head drive circuit 39 in the track direction (or in the longitudinal direction of the optical card). While the AT control circuit 33 executes the tracking drive of condenser lens 86 so that the beam spots S1, S3 follow the initial guide tracks T1, T2, information recording or reproduction is carried out based on the instruction of CPU 50 through the modulation/demodulation circuit 32.

Reaching the movement inversion position of the movement optical head 73, the optical head goes into an operation of jumping to a next information track. On this occasion the above-described track jump operation is carried out to detect a zero-cross in AT error signal. The above procedure is successively repeated to record or reproduce information in the recording area on the optical card.

Next described is the seek operation for moving the optical beams from presently following tracks to aimed tracks. The switch 37 is changed over from contact b to contact c through MPU 40 under instruction of calculation result of CPU 50 to the aimed tracks to generate a seek start signal A. The seek control circuit 36 outputs the USM drive voltage in FIG. 26C to the oscillator 67 to move the shuttle 62. A zero-cross in AT error signal, which appears when the beam spots S1, S3 cross tracks, is detected through the optical system and through the modulation/demodulation circuit and the AT control circuit. The signal is binarized by the MPU 40 and falls therein are counted by CPU 50. The CPU 50 compares the count number with the set track number. The seek operation is released where the difference between the numbers becomes zero, that is, when the beams come to drop on guide tracks immediately before the aimed guide tracks. Then the operation is immediately shifted to the track jump control for the ON and OFF voltage drive to move the remaining one track distance with fine steps before a zero-cross is detected for the aimed guide tracks. Then, the drive voltage for USM 7 is stopped through MPU 40 and CPU 50, and the movable optical head 73 scans the optical beams to follow the aimed tracks while recording/reproducing information, as described above.

In the track jump or in the seek operation, the position of condenser lens 86 is detected by the position sensor 64, which can detect the position nearly at the center of AT movable region, and the AT actuator 76 holds the condenser lens 86. After the above zero-cross is detected, the AT control is started through MPU 40 under instruction of CPU 50.

In the above embodiment of the present invention the shuttle 62 is moved in the longitudinal direction of optical card, i.e., in the direction perpendicular to the information tracks, and the oscillator 67 is mounted as a drive source for shuttle 62 to move and stop the shuttle 62 utilizing the self holding force of oscillator 67. The stop position information stops the drive of oscillator 67 through the switch 37 at the time of detection of zero-cross in the AT error signal as described. Accordingly, the shuttle 62 is always held in the stationary state in recording or reproducing information with the optical card C, whereby the information can be recorded or reproduced in the excellent state without vibration with the optical card C loaded thereon. Further, after the information recording or reproduction is finished on an information track, the shuttle is jumped onto a next track. In this operation, a detection signal of inversion position 78a, 78b of the movable optical head 77 is sent to the CPU 50 and the above-described AT control is released according to the CPU 50 at the timing. While holding the condenser lens 86, the track jump control circuit 35 generates an ON and OFF pulse signal and the shuttle drive circuit 34 supplies an ON and OFF drive voltage to the oscillator 67 to move the shuttle 62 with fine steps. After a zero-cross is detected for the next guide tracks, the AT control is activated to record or reproduce information again. This procedure is repeated in order.

Also, the seek operation from a present information track to a certain information track is carried out as follows. While holding the condenser lens 86 similarly as above, the seek control circuit 36 supplies a drive voltage through the switch 37 to USM 7. Continuously moving the shuttle 62, the CPU 50 compares the track transverse signal with the set track number. At coincidence with the set track number, the switch 37 is changed over through MPU 40 to execute the track jump control. Then, the shuttle 62 is moved with fine steps and a zero-cross is detected for aimed guide tracks. When the CPU 50 confirms the detection of zero-cross, a stop signal finishes the seek operation to the aimed information track.

As described above, the present invention is directed to such an arrangement that the shuttle seek operation is conducted to move the optical information recording medium of the optical card in the transverse direction of information tracks and that the optical head constructed as the separate optical system is linearly driven to and fro along the information track direction, which permits the entire apparatus to be arranged without wasted space. Also, using the linear ultrasonic motors as shuttle moving means enables the simple arrangement of components, achieving a reduction in size and weight and a reduction in price.

In addition, the linear drive is performed for moving the movable optical head having the condensing means to and fro along the information track direction, so that a moving amount and a driving power can be made smaller than those in a case where the shuttle holding the optical card is driven in the information track direction of the optical card.

Thus, the present invention can achieve high-speed recording and reproduction of information with an optical card and can provide an optical card recording/reproducing apparatus compact in size and light in weight.

Further, the accuracy is improved in positioning and stopping the shuttle because the ultrasonic motors are employed as the driving sources for the shuttle. Then, the shuttle holding the optical card can be set at a predetermined position without providing an extra shuttle lock mechanism as required in the conventional apparatus.

This reduces the cost of the apparatus and improves the reliability of the apparatus.

Also, the apparatus of the present invention has the transfer and setting means as loading and unloading means of optical card into the shuttle, which enables automatic insertion and discharge of optical card. Especially, using the ultrasonic motors as the transfer and setting means permits high-precision positioning of optical card into the shuttle.

Further, since the ultrasonic motors are used as the transfer means for passing the optical card to the shuttle, the narrow limited space can be effectively utilized between the shuttle and the optical card insertion portion in the apparatus body, decreasing the number of components, decreasing the size and weight of entire apparatus, and lowering the price.

The apparatus is so arranged that when a zero-cross in autotracking error signal is detected for guide tracks on optical card, the drive of ultrasonic motor as the drive source for shuttle is stopped based on the information signal to position the beam spots on aimed guide tracks, which obviates the position control circuit for shuttle. This lowers the cost of apparatus and decreases the size and weight in combination with the lock mechanism.

Also, in recording or reproduction, information can be recorded or reproduced with the optical card in the drive stop condition of shuttle, which can permit the autotracking/autofocusing control in an excellent state without vibration, providing recording/reproducing apparatus with high reliability.

What is claimed is:

1. An information recording/reproducing apparatus for recording and/or reproducing information with a card-like information recording medium in which a plurality of guide tracks are formed along a longitudinal direction of the recording medium, comprising:

an optical head, including an objective lens and an actuator for moving the objective lens, for irradiating the recording medium along the guide tracks with a light beam to thereby record and/or reproduce information;

optical head moving means for reciprocally moving said optical head along the longitudinal direction of the recording medium;

recording medium moving means for moving the recording medium in a direction perpendicular to the longitudinal direction of the recording medium; and means for controlling said actuator to hold said objective lens and for controlling said recording medium moving means so as to access the light beam from a current guide track where the light beam is currently positioned to another guide track different from the current guide track by a plural number of guide tracks.

2. An apparatus according to claim 1, further comprising holding means for holding the recording medium, wherein said recording medium moving means moves said holding means in the direction perpendicular to the guide tracks.

3. An apparatus according to claim 1, wherein said recording medium moving means is an ultrasonic motor.

4. An apparatus according to claim 1, wherein said optical head moving means is a voice coil motor.

5. An apparatus according to claim 1, wherein said optical head comprises a fixed optical head portion fixed to said apparatus and comprising a light source for emitting the optical beam and a sensor for receiving reflected light appearing when the optical beam is irradiated onto the recording medium, and a movable optical head portion in which at least said objective lens for focusing the optical beam on the recording medium and said actuator are mounted, said movable optical head portion being moved along the guide tracks by said optical head moving means.

\* \* \* \* \*

UNITED STATES PATENT AND TRADEMARK OFFICE
CERTIFICATE OF CORRECTION

PATENT NO. : 5,808,981

DATED : September 15, 1998

INVENTOR(S) : Suzuki

It is certified that error appears in the above-identified patent and that said Letters Patent is hereby corrected as shown below:

On the title page,

[56] REFERENCES CITED:

FOREIGN PATENT DOCUMENTS, "1021688         --1-21688
                          2093884  should  2-93884
                          2215629  read    2-215629
                          3008124"         3-008124--.

In the drawings,

SHEET 7:

FIGS. 10A-B, "DIVIATING" should read --DEVIATING--.

Signed and Sealed this

Sixth Day of July, 1999

Q. TODD DICKINSON

*Attest:*

*Attesting Officer*  *Acting Commissioner of Patents and Trademarks*